United States Patent
Srinivasan et al.

(10) Patent No.: US 7,322,042 B2
(45) Date of Patent: Jan. 22, 2008

(54) SECURE AND BACKWARD-COMPATIBLE PROCESSOR AND SECURE SOFTWARE EXECUTION THEREON

(75) Inventors: Pramila Srinivasan, San Jose, CA (US); John Princen, Cupertino, CA (US); Frank Berndt, Cupertino, CA (US); David Blythe, San Carlos, CA (US); William Saperstein, San Carlos, CA (US); Wei Yen, Los Altos Hills, CA (US)

(73) Assignee: BroadOn Communications Corp., Palo Alto, CA (US)

( * ) Notice: Subject to any disclaimer, the term of this patent is extended or adjusted under 35 U.S.C. 154(b) by 872 days.

(21) Appl. No.: 10/360,827

(22) Filed: Feb. 7, 2003

(65) Prior Publication Data

US 2004/0158742 A1    Aug. 12, 2004

(51) Int. Cl.
G06F 21/02 (2006.01)
G06F 13/20 (2006.01)
H04L 9/00 (2006.01)

(52) U.S. Cl. ............................ 726/17; 726/27; 705/51; 710/260

(58) Field of Classification Search ...................... None
See application file for complete search history.

(56) References Cited

U.S. PATENT DOCUMENTS

| 5,238,250 A | 8/1993 | Leung et al. |
| 5,261,069 A | 11/1993 | Wilkinson et al. |
| 5,367,698 A | 11/1994 | Webber et al. |
| 5,400,402 A | 3/1995 | Garfinkle |
| 5,404,505 A | 4/1995 | Levinson |
| 5,528,513 A | 6/1996 | Vaitzblit et al. |
| 5,586,264 A | 12/1996 | Belknap et al. |
| 5,610,839 A | 3/1997 | Karolak et al. |

(Continued)

FOREIGN PATENT DOCUMENTS

EP    0 992 922 A1    4/2000

(Continued)

OTHER PUBLICATIONS

Arbaugh, William A., et al., "A Secure and Reliable Bootstrap Architecture," University of Pennsylvania (1996).

(Continued)

*Primary Examiner*—Christopher Revak
(74) *Attorney, Agent, or Firm*—Perkins Coie LLP

(57) ABSTRACT

A secure processor assuring application software is executed securely, and assuring only authorized software is executed, monitored modes and secure modes of operation. The former executes application software transparently to that software. The latter verifies execution of the application software is authorized, performs any extraordinary services required by the application software, and verifies the processor has obtained rights to execute the content. The secure processor (1) appears hardware-identical to an ordinary processor, with the effect that application software written for ordinary processors can be executed on the secure processor without substantial change, (2) needs only a minimal degree of additional hardware over and above those portions appearing hardware-identical to an ordinary processor. The secure processor operates without substantial reduction in speed or other resources available to the application software. Functions operating in secure mode might reside in an on-chip non-volatile memory, or might be loaded from external storage with authentication.

115 Claims, 4 Drawing Sheets

U.S. PATENT DOCUMENTS

| | | | |
|---|---|---|---|
| 5,638,443 A | 6/1997 | Stefik et al. | |
| 5,715,398 A | 2/1998 | Lubenow et al. | |
| 5,715,403 A | 2/1998 | Stefik | |
| 5,765,152 A | 6/1998 | Erickson | |
| 5,781,901 A | 7/1998 | Kuzma | |
| 5,790,170 A | 8/1998 | Suzuki | |
| 5,809,242 A | 9/1998 | Shaw et al. | |
| 5,815,662 A | 9/1998 | Ong | |
| 5,818,512 A | 10/1998 | Fuller | |
| 5,829,046 A | 10/1998 | Tzelnic et al. | |
| 5,867,223 A | 2/1999 | Schindler et al. | |
| 5,892,900 A | 4/1999 | Ginter et al. | |
| 5,903,723 A | 5/1999 | Beck et al. | |
| 5,905,860 A | 5/1999 | Olsen et al. | |
| 5,913,039 A | 6/1999 | Nakamura et al. | |
| 5,933,498 A | 8/1999 | Schneck et al. | |
| 5,983,227 A | 11/1999 | Nazem et al. | |
| 6,016,348 A | 1/2000 | Blatter et al. | |
| 6,032,200 A | 2/2000 | Lin | |
| 6,038,601 A | 3/2000 | Lambert et al. | |
| 6,044,157 A | 3/2000 | Useaka et al. | |
| 6,049,821 A | 4/2000 | Theriault et al. | |
| 6,052,720 A | 4/2000 | Traversat et al. | |
| 6,085,193 A | 7/2000 | Malkin et al. | |
| 6,141,756 A * | 10/2000 | Bright et al. | 726/22 |
| 6,148,340 A | 11/2000 | Bittinger et al. | |
| 6,157,721 A | 12/2000 | Shear et al. | |
| 6,167,441 A | 12/2000 | Himmel | |
| 6,185,625 B1 | 2/2001 | Tso et al. | |
| 6,205,475 B1 | 3/2001 | Pitts | |
| 6,212,657 B1 | 4/2001 | Wang et al. | |
| 6,219,680 B1 | 4/2001 | Bernardo et al. | |
| 6,219,708 B1 | 4/2001 | Martenson | |
| 6,226,618 B1 | 5/2001 | Downs et al. | |
| 6,243,719 B1 | 6/2001 | Ikuta et al. | |
| 6,256,637 B1 | 7/2001 | Venkatesh et al. | |
| 6,259,471 B1 | 7/2001 | Peters et al. | |
| 6,289,452 B1 | 9/2001 | Arnold et al. | |
| 6,321,209 B1 | 11/2001 | Pasquali | |
| 6,330,566 B1 | 12/2001 | Durham | |
| 6,338,050 B1 | 1/2002 | Conklin et al. | |
| 6,377,972 B1 | 4/2002 | Guo et al. | |
| 6,412,011 B1 | 4/2002 | Guo et al. | |
| 6,389,460 B1 | 5/2002 | Stewart et al. | |
| 6,412,008 B1 | 6/2002 | Fields et al. | |
| 6,427,238 B1 | 7/2002 | Goodman et al. | |
| 6,446,113 B1 | 9/2002 | Ozzie et al. | |
| 6,466,048 B1 * | 10/2002 | Goodman | 326/8 |
| 6,480,883 B1 | 11/2002 | Tsutsumitake | |
| 6,510,502 B1 | 1/2003 | Shimizu | |
| 6,526,581 B1 | 2/2003 | Edson | |
| 6,557,104 B2 * | 4/2003 | Vu et al. | 713/189 |
| 6,571,279 B1 | 5/2003 | Herz et al. | |
| 6,574,605 B1 | 6/2003 | Sansders et al. | |
| 6,594,682 B2 | 7/2003 | Peterson et al. | |
| 6,606,644 B1 | 8/2003 | Ford et al. | |
| 6,637,029 B1 | 10/2003 | Maissel et al. | |
| 6,654,388 B1 | 11/2003 | Lexenberg et al. | |
| 6,669,096 B1 * | 12/2003 | Saphar et al. | 235/492 |
| 6,675,350 B1 | 1/2004 | Abrams et al. | |
| 6,691,312 B1 | 2/2004 | Sen et al. | |
| 6,697,948 B1 * | 2/2004 | Rabin et al. | 726/30 |
| 6,704,797 B1 | 3/2004 | Fields et al. | |
| 6,785,712 B1 | 8/2004 | Hogan et al. | |
| 6,805,629 B1 | 10/2004 | Weiss | |
| 6,811,486 B1 | 11/2004 | Luciano, Jr. | |
| 6,826,593 B1 | 11/2004 | Acharya et al. | |
| 6,832,241 B2 | 12/2004 | Tracton et al. | |
| 6,873,975 B1 | 3/2005 | Hatakeyama et al. | |
| 6,901,386 B1 | 5/2005 | Dedrick et al. | |
| 6,920,567 B1 | 7/2005 | Doherty et al. | |
| 6,993,557 B1 | 1/2006 | Yen | |
| 7,092,953 B1 | 8/2006 | Haynes | |
| 2001/0014882 A1 | 8/2001 | Stefik et al. | |
| 2002/0016818 A1 | 2/2002 | Kirani et al. | |
| 2002/0032784 A1 | 3/2002 | Darago et al. | |
| 2002/0059384 A1 | 5/2002 | Kaars | |
| 2002/0071557 A1 | 6/2002 | Nguyen | |
| 2002/0116615 A1 | 8/2002 | Nguyen et al. | |
| 2002/0138764 A1 | 9/2002 | Jacobs et al. | |
| 2002/0160833 A1 | 10/2002 | Lloyd et al. | |
| 2002/0161673 A1 | 10/2002 | Lee et al. | |
| 2002/0162115 A1 | 10/2002 | Brucknet et al. | |
| 2002/0165022 A1 | 11/2002 | Hiraoka | |
| 2002/0169974 A1 | 11/2002 | McKune | |
| 2002/0184160 A1 | 12/2002 | Tadayon et al. | |
| 2003/0023564 A1 | 1/2003 | Padhye et al. | |
| 2003/0028622 A1 | 2/2003 | Inoue et al. | |
| 2003/0114227 A1 | 6/2003 | Rubin | |
| 2003/0120541 A1 | 6/2003 | Siann et al. | |
| 2003/0144869 A1 | 7/2003 | Fung et al. | |
| 2004/0015426 A1 | 1/2004 | Tadayon et al. | |
| 2004/0044901 A1 | 3/2004 | Serkowski | |
| 2004/0054923 A1 | 3/2004 | Seago et al. | |
| 2004/0098297 A1 | 5/2004 | Borthwick | |
| 2004/0098610 A1 | 5/2004 | Hrastar | |
| 2004/0102987 A1 | 5/2004 | Takahashi et al. | |
| 2005/0004875 A1 | 1/2005 | Konito et al. | |
| 2006/0090084 A1* | 4/2006 | Buer | 713/189 |
| 2007/0016832 A1* | 1/2007 | Weiss | 714/100 |
| 2007/0067826 A1* | 3/2007 | Conti | 726/2 |
| 2007/0150730 A1* | 6/2007 | Conti | 713/166 |

FOREIGN PATENT DOCUMENTS

| | | |
|---|---|---|
| EP | 1 091 274 A2 | 4/2001 |
| JP | 2002024178 A1 | 1/2002 |
| WO | WO 02/29642 A2 | 4/2002 |
| WO | WO 02/30088 A1 | 4/2002 |

OTHER PUBLICATIONS

Aziz, Ashar, et al., "Privacy and Authentication for Wireless Local Area Networks," Sun Microsystems, Inc., (1993).

Davida, George I., et al., "Defending Systems Against Viruses through Cryptographic Authentication," IEEE pp. 312-318 (1989).

Diffie, Whitfield, "The First Ten Years of Public-Key Cryptography," Proceedings of the IEEE, vol. 96, No. 5, pp. 560-577 (May 1988).

White, et al., "ABYSS: An Architecture for Software Protection," IEEE Transactions on Software Engineering, vol. 16, No. 6, pp. 619-629(1990).

White, Steve R., et al., "Introduction to the Citadel Architecture: Security in Physically Exposed Environments," IBM Research Division (1991).

Wobber, Edward, et al., "Authentication in the Taso Operating System," Digital Systems Research Center (1993).

Yee, B., et al., "Secure Coprocessors in Electronic Commerce Applications," Proceedings of the First USENIX Workshop on Electronic Commerce (1995).

Davida, G. I., et al., "Defending Systems Against Viruses through Cryptographic Authentication," IEEE, 312-318 (1989).

Yee, B., "Using Secure Coprocessors," Ph.D. Thesis, School of Computer Science, Carnegie Mellon University, Pittsburgh, PA (1994).

Nonnenmacher, Jorg et al. "Asynchronous Multicast Push: AMP." 13th International Conference on Computer Communication. Nov. 18-21, 1997, pp. 419-430, vol. 13, Proceedings of International Conference on Computer Communication, Cannes.

Rodriguez, Pablo et al. "Improving the WWW: caching or multicast?" Computer Networks and ISDN Systems, Nov. 25, 1998, pp. 2223-2243, vol. 30, No. 22-23.

Wang, Zheng et al. "Prefetching in World Wide Web." Global Telecommunications Conference, Nov. 18-22, 1996, pp. 28-32, London.

Bharadvaj et al., Proceedings of the 17th IEEE Symposium on Reliable Distributed Systems, pp. 118-123 (1998).

Hori et al., *Computer Networks*, 33(1-6):197-211 (2000).

Traylor, Scott, "Graphic Resolution and File Sizes", http://www.traylormm.com/harvard/53graphicresolution/, no date provided.

Diffie, Whitfield, et al., "New Directions in Cryptography," (1976).

Dyer, Joan G., et al., "Building the IBM 4758 Secure Coprocessor," Computer, pp. 2-12 (Oct. 2001).

Frantzen, Mike, et al., "StackGhost: Hardware Facilitated Stack Protection," Proceedings of the 10th USENIX Security Symposium (2001).

Fujimura, Ko., et al., "Digital-Ticket-Controlled Digital Ticket Circulation," Proceedings of the 8th USENIX Security Symposium (1999).

Gligor, Virgil D., "20 Years of Operating Systems Security," University of Maryland, no date.

Gutmann, Peter, "The Design of a Cryptographic Security Architecture," Proceedings of the 8th USENIX Security Symposium (1999).

Itoi, Naomaru, "SC-CFS: Smartcard Secured Cryptographic File System," Proceedings of the 10th USENIX Security Symposium (2001).

Jaeger, Trent, et al., "Building Systems thet Flexibly Control Downloaded Executable Context," Proceedings of the 6th USENIX UNIX Security Symposium (1996).

Karger, Paul A., "New Methods for Immediate Revocation," IEEE (1989).

Kent, Stephen Thomas, "Protecting Externally Supplied Software in Small Computers," Massachusetts Institute of Technology (1980).

Kogan, Noam, et al., "A Practical Revocation Scheme for Broadcast Encryption Using Smart Cards," Proceedings of the 2003 IEEE Symposium on Security and Privacy (2003).

Lampson, Butler, et al., "Authentication in Distributed Systems" Theory and Practice, Digital Equipment Corporation (1992).

Lotspiech, Jeffrey, et al., "Broadcast Encryption's Bright Future," Computer, pp. 57-63 (Aug. 2002).

Lotspiech, Jeffrey, et al., "Anonymous Trust: Digital Rights Management Using Broadcast Encryption," Proceedings of the IEEE, vol. 92, No. 6, pp. 898-909 (Jun. 2004).

Monrose, et al., "Toward Speech-Generated Cryptographic Keys on Resource Constrained Devices," Proceedings of the 11th USENIX Security Symposium (2002).

Neumann, P.G., et al., "A Provably Secure Operating System," Stanford Research Institute (1975).

Palmer, Elaine R., "An Introduction to Citadel—A Secure Crypto Coprocessor for Workstations," IBM Research Division (1992).

Peterson, David S., et al., "A Flexible Containment Mechanism for Executing Untrusted Code," Proceedings of the 11th USENIX Security Symposium (2002).

Rubin, Aviel D., "Trusted Distribution of Software Over the Internet," Internet Society 1995 Symposium on Network and Distributed System Security.

Smith, Sean W., "Secure Coprocessing Applications and Research Issues," Los Alamos Unclassified Release LA-UR-96-2805 (1996).

Smith, Sean W., et al., "Building a High-Performance, Programmable Secure Coprocessor," Secure Systems and Smart Cards, IBM T.J. Watson Research Center, NY (1998).

Smith, Sean W., et al., "Using a High-Performance, Programmable Secure Coprocessor," Proceedings of the Second International Conference on Financial Cryptography, no date.

Smith, Sean, et al., "Validating a High-Performance, Programmable Secure Coprocessor," Secure Systems and Smart Cards, IBM T.J. Watson Research Center, NY, no date.

Stefik, Mark, "Trusted Systems," Scientific American, pp. 78-81 (Mar. 1997).

Tygar, J.D., et al., "Strongbox: A System for Self-Securing Programs," pp. 163-197, no date.

Tygar, J.D. et al., "Dyad: A System for Using Physically Secure Coprocessors," School of Computer Science, Carnegie Mellon University (1991).

Van Doom, Leendert, "A Secure Java™ Virtual Machine," Proceedings of the 9th USENIX Security Symposium (2000).

\* cited by examiner

Flow of Illustration to enter Secure Mode

# SECURE AND BACKWARD-COMPATIBLE PROCESSOR AND SECURE SOFTWARE EXECUTION THEREON

BACKGROUND OF THE INVENTION

1. Field of the Invention

The invention relates to secure processors and to secure software execution thereon, such as for example to secure processors capable of secure execution of application software.

2. Related Art

In known computing systems, the availability of processing capability, such as provided by microprocessors and other processing devices, is no longer a significant limit when considering the value of the computing system. Availability of application software and multimedia content, or more precisely, authorization to use that application software and multimedia content, for execution by those processors (and for presentation by those processors) has become a substantial limit. One effect of this is that a substantial value to many computing systems is the application software and multimedia content that executes on the device or platform. Both application software and multimedia content have become more easily distributed, such as for example using a communication network or by distribution using inexpensive CD-ROM media, with the effect that protecting against unauthorized copying and distribution (sometimes called "software piracy") has become an economically important concern. Accordingly, one problem in the known art is to assure that such application software and multimedia content, being valuable, are only used on processors when the right to do so has been authorized, such as for example when that right has been properly paid for, or the integrity of the content verified with respect to information from a trusted content publishing entity.

Another problem in the known art is that, while it is desired to provide application software and multimedia content with the property that such application software and multimedia content cannot be used on processors without authorization or alteration, it is not desirable to redesign or re-author the application software or multimedia content to provide this property. There is a sufficient set of application software and multimedia content available, and the value of that application software and multimedia content is sufficiently large, that the approach of altering that application software or that multimedia content would likely be expensive, unreliable, and unwieldy.

Accordingly, it would be advantageous to restrict application software and multimedia content to those processors for which that application software and multimedia content is authorized, without having to substantially alter the original application software or multimedia content.

SUMMARY OF THE INVENTION

The invention provides a secure processor, and a method and system for using that secure processor, capable of assuring that application software is executed securely, and capable of assuring that only authorized application software is executed and only authorized multimedia content is presented. Further, it is also important to ensure that the authorized content can be played only on the device on which rights or permission for the content have been purchased and can be verified. The secure processor includes two modes of operation, a monitored mode and a secure mode. The former executes application software transparently to that application software. The latter verifies that execution of the application software (and presentation of the multimedia content) is authorized, and performs any extraordinary services required by the application software. The secure processor appears hardware-identical, to the application software, to an ordinary processor, with the effect that application software written for ordinary processors can be executed on the secure processor without substantial change. The secure processor needs only a minimal degree of additional hardware over and above those portions that appear hardware-identical to an ordinary processor, with the effect that the secure processor can operate without substantial reduction in speed or other resources available to the application software. In one embodiment, a portion of the secure processor is substantially identical to a semiconductor die for an original ordinary processor (except for using different die size or manufacturing technology), with the effect that there is substantial assurance that the application software will execute identically on the secure processor as it would have on the original ordinary processor.

In one embodiment, the secure processor initiates execution at power-on in secure mode. In this initial operation phase, the secure processor executes secure code in secure mode. The secure code is maintained in a persistent memory internal to the secure processor chip and therefore trustable. The secure code loads additional source code from one or more trusted sources, verifying both the trustworthiness of the sources and the authenticity of the additional source code, with reference to security information also maintained in the persistent memory internal to the secure processor chip and therefore trustable. The security information might include, but is not necessarily limited to, encryption keys, secure hash values, or other data for verification of the trusted sources and authentication of the additional source code.

Once loaded, the additional secure code causes the secure processor to request application software from trusted sources, verifies that the secure processor has authorization to execute the requested application software, verifies that the application software has been correctly loaded, and checks the integrity of that application software. In the context of the invention, there is no particular requirement that either the persistent memory or the trusted source have the particular implementation described herein. For one example, not intended to be limiting in any way, either the persistent memory, or one or more of the trusted sources, might be replaced or supplemented with a hardware device coupled to the secure processor (such as by a user). In this example, the secure processor would verify the integrity of the coupling and verify the authenticity and correct operation of the hardware device before trusting any code loaded from that source.

The secure processor is able to exit secure mode and execute the application software that has been correctly loaded in monitored mode. Application software executes without substantial change in original code for that application software, with the effect that the application software sees a processor environment that is not substantially different from an ordinary processor. When the application software needs services the secure processor oversees, the application software generates an interrupt, causing the secure mode to be re-entered, the services to be delivered to the application software, and the secure mode to be exited, with the effect that the application software can continue to execute in monitored mode. For one example, not limiting in any way, the application software might request additional application software modules to be requested, loaded, and executed. Among other services, the secure processor might oversee I/O operations, which the application software might request using an API (application programming interface) provided to secure code executable by the secure processor.

The secure processor is also able to interrupt the application software using a timer, enter secure mode, perform any desired steps, and re-enter monitored mode. Where secure mode might be entered by more than one technique, the secure processor is able to determine by which technique secure mode is entered. The secure processor is also able to record accesses to external memory, with the effect of being able to verify correct execution by the application software. Among other features, the secure processor might have the capability of overseeing (that is, reviewing and confirming the propriety of) I/O operations, or the secure processor might have the capability of performing (preferably, after reviewing and confirming the propriety of) secure operations at the request of application software.

For one example, not intended to be limiting in any way, the secure processor is able to examine those locations in external memory the application software attempts to access. If the application software attempts to access any locations outside a range of locations permitted by the secure processor, the secure processor might determine in response thereto that the application software is acting improperly. For example, not intended to be limiting in any way, in such cases the application software might have a software error, might include a software virus, or might be designed to be actively malicious. In response thereto, the secure processor might take appropriate action to limit any such improper effect. For example, again not intended to be limiting in any way, in such cases the secure processor might take action to limit access by the application software to those external memory locations, might take action to halt operation by the application software, or might take action to perform a software virus check or software virus clean-up of the application software.

The secure processor is also able to perform encryption or decryption on behalf of application software, with the effect that the application software need not be aware that encryption or decryption, or other security features, are being performed with regard to its ordinary operations. For a first example, not intended to be limiting in any way, the application software might perform a check for authenticity on additional code or on multimedia content loaded from a server, from external mass storage, or from external memory, without having access to the unique ID or private keys for the secure processor, but still using the full power of the security features of the secure processor. For a second example, again not intended to be limiting in any way, the application software might encrypt or decrypt secure information it communicates with external entities, again without having access to the unique ID or encryption or decryption keys for the secure processor, but still using the full power of the security features of the secure processor.

In one embodiment, the secure processor includes a unique ID, and is capable of using that unique ID (and unique encryption or decryption keys associated with that unique ID) to uniquely identify the particular instance of the secure processor. In such embodiments, when performing encryption or decryption on behalf of application software, the secure processor uses the unique ID and unique encryption or decryption keys. For example, not intended to be limiting in any way, the secure processor might perform encryption or decryption on behalf of application software, and thus use the unique ID and unique encryption or decryption keys, when communicating with external entities. In one such example, the secure processor might perform communication with external entities to confirm, exchange, or obtain DRM (digital rights management) information.

The secure processor maintains the unique ID, code signatures or cryptographic hashes, and unique encryption or decryption keys, as well as any other information specific to the particular instance of the secure processor, in a non-volatile memory (such as for example an NVROM). The NVROM includes a non-bonded pin used during manufacture or configuration of the secure processor to record information specific to the particular instance of the secure processor, which is left non-bonded after manufacture or configuration, with the effect that the NVROM cannot be written a second time.

Having a unique ID (and unique encryption or decryption keys) provides systems including the secure processor with several advantages:

- Use of the secure processor to communicate with servers is traceable, so that users making unauthorized attempts to download application software or multimedia content can be called to account.
- Securely embedding the unique ID and unique encryption or decryption keys allows servers to trust the secure processor without having to verify or trust the portion of the secure processor, such as its secure boot code, which attempts to download application software or multimedia content. The server need only trust the manufacturer to securely embed the unique ID and unique encryption or decryption keys.
- Systems including the secure processor are resistant to tampering by users attempting to intercept signals to and from the secure processor, or otherwise present in the system, because sensitive data communicated with the secure processor can be encrypted for security. Attempting to compromise sensitive data would otherwise involve difficult deconstruction of the secure processor chip.
- In the secure processor, the CPU that executes application software or presents multimedia content is substantially identical to an original non-secure processor, so attempts to disable the security features of the secure processor would also disable desired functionality of that CPU.
- The secure processor can securely verify rights by the CPU to execute application software or to present multimedia content. For example, not intended to be limiting in any way, a trusted server (or other trusted entity, such as a certification authority) might issue a secure digital purchase receipt for which authenticity can be verified by the secure processor, such as using the unique ID and unique encryption or decryption keys. In such examples, the secure digital purchase receipt might uniquely identify the specific device (or class of device) having the right to execute application software or to present multimedia content.
- The secure processor can enforce copy prevention and copy protection of application software and multimedia content. For example, not intended to be limiting in any way, such content might include (1) a set of purchased application software the CPU is permitted to execute, or purchased multimedia content the CPU is permitted to present, (2) digital rights to enable such execution or presentation, (3) information for use between the CPU and another device, such as for example a peer-to-peer message, intended to be limited to a specific device (or class of devices).

DETAILED DESCRIPTION OF THE PREFERRED EMBODIMENT

Figure 1:
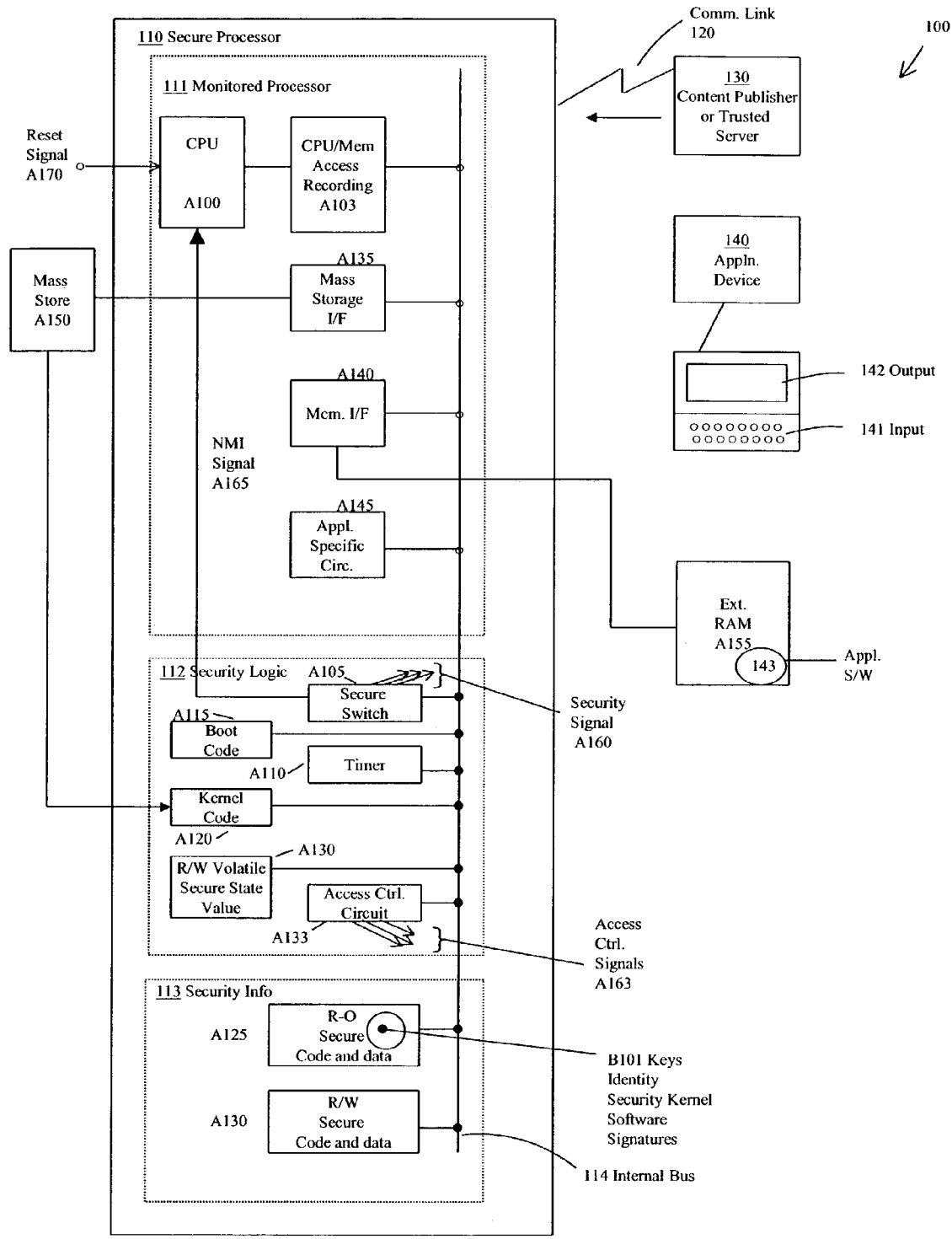
FIG. 1 shows a block diagram of a system including a secure processor capable of secure execution.

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

The phrase "secure processor" describes a device having the capability of assuring that only trusted software is executed on a subunit, the subunit including a "processor" or "processing unit," (herein sometimes referred to as a "CPU"). Within the secure processor, the concept of a processor or processing unit is broad, and is intended to include at least the following: a general-purpose processor having a general instruction set, a special purpose processor having a limited instruction set, a set of special purpose circuitry capable of executing or interpreting program instructions, a set of firmware program instructions capable of emulating a secure processor of any type, any reasonable generalization thereof, and the like.

The phrase "application software" describes a set of instructions or parameters capable of being executed or interpreted by a processor. As noted herein, the concept of application software is broad, and is intended to include at least the following: software or firmware program instructions, software or firmware program parameter values, source code capable of being compiled by a programming language compiler or interpreted by a programming language interpreter, macro definitions for a compiled or interpreted programming language, commands or requests to be received and acted upon by an application program, any reasonable generalization thereof, and the like.

The phrase "multimedia content" describes a set of information or parameters capable of being presented to a user. As noted herein, the concept of multimedia content is broad, and is intended to include at least the following: animation, audiovisual movies, still pictures, or sound, whether embedded in data for interpretation and presentation by software or firmware program instructions; embedded in software or firmware program instructions for producing such data themselves; embedded in a markup language for multimedia content, such as DHTML, SGML, VRML, Macromedia Flash, and the like; commands or requests to be received and acted upon by an application program; any reasonable generalization thereof; and the like.

The phrases "monitored mode" and "secure mode" describe possible operational states of the secure processor. As noted herein, the concepts of monitored mode and secure mode are broad, and are intended to include at least the following: any distinguishable states in which instructions executed or interpreted by the secure processor have distinguishable degrees of access to capabilities of the processor, and in which the secure processor when in secure mode is capable of performing any type of monitoring or restriction of the secure processor when in monitored mode, and the like.

The concepts of transparent execution (of application software by the secure processor) and apparent hardware identity (of the secure processor to the application software) describe the capability of the secure processor to execute application software, in the view of that application software, as if that application software were executing on an ordinary processor. This has the effect that the secure processor can execute that application software without any need for modification of that application software, but is still capable of maintaining security features as described herein. For just one example, not limiting in any way, a portion of the secure might be substantially identical to a semiconductor die for an original ordinary processor, with the effect that there is substantial assurance that the application software will execute identically on the secure processor as it would have on an original ordinary processor.

The phrase "power on" describes an initial operation phase of a processing unit, whether occurring after an actual change in power supply, a reset signal, or any other substantial initialization in state for the secure processor. As noted herein, the concept of power-on is broad, and is intended to include any initial operational state described herein, as well as generalizations thereof.

The phrases "secure code" and "secure boot loader code" describe program instructions, interpretable or executable by the secure processor, and known to the secure processor to be trustable. Secure code might, for example, not limiting in any way, be known to be trustable by virtue of having been maintained in persistent memory in the secure processor chip. Starting from such trustable secure code, additional source code can be established as "secure code" by virtue of having been received from a trusted source and authenticated to be accurate by previously established "secure code" or "secure boot loader code". As noted herein, the concept of secure code is broad, and is intended to include any program code for which the secure processor can trust that code, including for example, to perform security functions.

The phrases "security functions" and "security kernel software" describe program instructions, interpretable or executable by the secure processor, known to the secure processor to be verifiable, and capable of implementing functions relating to security, authentication, or verification. For example, not intended to be limiting in any way, functions including digital signatures, encryption and decryption, verification of digital signatures, and the like, might be implemented by security functions or security kernel software. In one embodiment, such security functions or security kernel software might be made available for use by application software using an API (application programming interface). In one embodiment, the security kernel software is loaded by the secure boot loader code and verified for integrity and/or authenticity before execution. That portion of software related to security, having been authenticated and maintained in (possibly volatile) memory within the secure processor chip, is included within the concept of "secure code".

The phrase "secure processor chip" (herein sometimes referred to as the "chip") describes the physical hardware on which the secure processor is implemented. As described herein, the secure processor chip includes hardware structure and program instructions, known to the secure processor to be trustable, and difficult for others to interfere with or to breach the security of.

The scope and spirit of the invention is not limited to any of these definitions, or to specific examples mentioned therein, but is intended to include the most general concepts embodied by these and other terms.

System Elements

FIG. 1 shows a block diagram of a system including a secure processor capable of secure execution.

A system 100 includes a secure processor 110, a communication link 120, and at least one software or content publisher 130. Optionally, the software or content publisher 130 (herein sometimes called the trusted server 130) might include a trusted server capable of online or offline additional content delivery to the secure processor 110 or to devices controlled by the secure processor 110.

In one embodiment, the system 100 also includes an application device 140, including at least one input device 141 and at least one output device 142, operating under control of application software 143 executed by the secure processor 110.

The application device 140 might perform any application desired when the secure processor operates in monitored mode. For one example, not limiting in any way, the application device 140 might include a device for playing or participating in a real-time audiovisual game, such as might be installed in an arcade or at a personal computer. However, there is no particular requirement in the context of the invention that the application device 140 is so specific. Rather, the application device 140 may generally include a gaming device; a personal computer or personal workstation; any hand-carried device, such as a pager, a PDA (personal digital assistant) or other hand-held computer, a notebook or laptop computer, a telephone, a watch, a location or condition sensor, a biometric sensing or reporting device, a pacemaker, a telemetry device, or a remote homing device.

More generally, so long as the secure processor 110 is able to perform the functions described herein, the application device 140 may include any device following a computing paradigm.

For additional delivery of authentic applications or content to the chip, the communication link 120 might include a communication path from the trusted server 130 to the secure processor 110. For example, not intended to be limiting in any way, the communication link 120 might include a communication path using the Internet or a portion thereof, either in real time, or using one or more store and forward devices, or using one or more intermediate caching devices, or physical delivery through storage media. However, in alternative embodiments, the communication link 120 may include a communication path to a private or public switched telephone network, a leased line or other private communication link, a radio transceiver, a microwave transceiver, a wireless or wireline modem, or any other device or system capable of communication with the trusted server 130 on behalf of the secure processor 110. More generally, the communication link 120 might include any conceivable technique for delivery of content, such as for example storage media (such as a CD-ROM) physically shipped and delivered from the trusted server 130.

The trusted server 130 includes a content publishing, delivery, or serving entity, such as for example as part of an electronic distribution system. In one embodiment, the trusted server 130 is (optionally) capable of generating a digital signature for any content it distributes, such as for example application software or multimedia content, with the effect that the secure processor 110 is capable of verifying the authenticity of that content. In one embodiment, that digital signature might be generated using a digital signature technique used with a public key cryptosystem, a system of a like nature, or another type of system capable of generating information from which the content can be verified for authenticity.

In alternative embodiments, the trusted server 130 may include a logically remote device capable of receiving messages including requests for information, and generating messages including responses to those requests for information. For example, not intended to be limiting in any way, the trusted server 130 might include an internet server including a high-end PC or workstation. Although in one embodiment the trusted server 130 includes a stand-alone server, there is no particular requirement in the context of the invention that the trusted server 130 is so specific. Rather, the trusted server 130 may generally include any device capable of acting as described herein, and may include either hardware components or software components or both. Moreover, there is no particular requirement in the context of the invention that the trusted server 130 includes any particular combination of components, or even that the trusted server 130 is a single device or even that it includes the whole of any particular device. Rather, the trusted server 130 may generally include one or more portions of another device, and may generally include more than one device (or portions thereof) operating in conjunction or cooperation. More generally, as described above, the trusted server 130 might include any conceivable device for creation or encapsulation of content for delivery, such as for example a device for writing storage media (such as a CD-ROM) to be physically shipped and delivered to the secure processor 110.

As noted above, more generally, the trusted server 130 might include any conceivable technique for delivery of content. In the context of the invention, there is no particular requirement for any actual online content delivery, or even for any live or real-time link between the secure processor 110 and the trusted server 130. For one example, not intended to be limiting in any way, application software or multimedia content might be delivered from the trusted server 130 to the secure processor 110 by any of the following techniques, or some combination or conjunction thereof:

The application software or multimedia content might be delivered using an interactive or switched communication system.

The application software or multimedia content might be delivered using physical storage media.

The application software or multimedia content might be delivered, by any technique, from a third party, in an encoded or encrypted form, and a key for decoding or decryption might be delivered, by any technique, from the trusted server 130.

The application software or multimedia content might be delivered, by any technique, from a third party, and a certificate or other guarantee of authenticity might be delivered, by any technique, from the trusted server 130.

The application software or multimedia content might be delivered, by any technique, using intermediate storage devices or other types of caching devices, using the Internet or any other distribution technique.

The secure processor 110 includes a monitored processor 111, a set of security logic 112, and a set of security information 113. The secure processor 110 can operate in either a monitored mode or a secure mode. When operating in the monitored mode, the secure processor 110 uses circuitry including the monitored processor 111. When operating in the secure mode, the secure processor 110 uses circuitry including the monitored processor 111 and the security logic 112, and also uses data including the security information 113.

1. Monitored Processor

The monitored processor 111 includes an internal bus 114, a CPU A100, a CPU memory interface A103, a mass storage interface A135, a memory interface A140, a set of application-specific circuitry A145, a mass storage device A150, a set of RAM A155.

The internal bus 114 is capable of communicating signals, including requests for data and responses including data, among portions of the monitored processor 111. The internal bus 114 is coupled to the CPU memory interface A103, the mass storage interface A135, the memory interface A140, the application-specific circuitry A145, and the mass storage device A150.

The CPU A100 might include any general-purpose processor or special purpose processor capable of carrying out the functions described herein. For example, the CPU A100 might include a general-purpose processor such as those made by AMD or Intel, or a special purpose processor such as a DSP or an embedded micro-controller.

The CPU memory interface A103 is coupled to the CPU A100. The CPU memory interface A103 receives memory access requests from the CPU A100 and records accesses by the CPU A100 to RAM A155. Although in one embodiment the CPU memory interface A103 records all such accesses, in alternative embodiments the CPU memory interface A103 may choose to record only some of such accesses, such as only those accesses specified in a selected set of memory locations specified by the security logic 112 or the security information 113.

The mass storage interface A135 performs appropriate interface functions with the mass storage device A150. The mass storage device A150 might include a hard disk, floppy disk, tape, or other types of mass storage.

The memory interface A140 performs appropriate interface functions with the external memory (that is, the RAM A155). The RAM A155 includes all forms of random access memory, whether writable or not, and if writable, whether writable more than once or only once.

The application-specific circuitry A145 performs any other functions specific to the particular monitored processor 111, not already performed by the CPU A100. The CPU A100 and the application-specific circuitry A145 might perform selected functions in conjunction or cooperation.

2. Security Logic

The security logic 112 includes a secure mode switch circuit A105, a secure timer circuit A110, a set of secure boot code A115, an access control circuit A133, a secure mode active signal A160, a set of access control signals A163, a NMI (non-maskable interrupt) signal A165, and a port A171 for receiving an external reset signal A170. In addition, a set of secure code A120 that assists with security functions might be maintained in mass storage A150.

The secure processor 110 is capable of responding to the external reset signal A170. In response to the reset signal A170, the CPU A100 transfers control to (that is, begins execution of instructions at a new location) a pre-selected reset location in the secure boot code A115. Neither the pre-selected reset location nor the secure boot code A115 is alterable by the CPU A100 or any application software.

In response to the reset signal A170, the secure mode switch circuit A105 generates the secure mode active signal A160, which sets up access rights so that the CPU A100 is allowed to access the secure boot code A115, execute its instructions, and read and write data using the security information 113. On reset, the secure processor 110 transfers control to the reset location and executes the secure boot code A115, and (the secure mode active signal A160 being logical TRUE) allows the CPU A100 to access restricted secure portions of the chip. In one embodiment, the secure boot code A115 is maintained in a separate non-volatile memory A115, and neither its location nor its contents are alterable by any application software.

The secure boot code A115 locates and loads any additional software and security functions included in the secure kernel code A120 from external mass store A150 and into internal RAM A120, after performing any necessary security checks.

After locating and loading any additional secure code A120, the CPU A100 transfers control to, and begins execution of, that secure code A120. The secure code A120 causes the CPU A100 to prepare to authenticate and execute the application code 143. Once the preparation to execute the application code 143 is complete, the secure code A120 causes the secure processor 110 to exit secure mode.

The secure processor 110 is also capable of responding to an NMI signal A165. The NMI signal A165 might for example be generated by application code 143 (such as for example by a program instruction executable by the CPU A100) to request a service to be performed in secure mode. An example of such a service might be to perform a secure function or another function that only the secure code A120 has authority to perform. To request such a service, the application code 143 sets selected bits in the security logic 112. The secure mode logic sets the secure mode active signal A160 to be logical TRUE, which enables the CPU A100 to have access to secure parts of the secure processor 110. Simultaneously the security logic 112 sends the NMI signal A165 to the CPU A100, causing the CPU A100 to transfer control to the secure boot code A115 internal to the chip. The secure boot code 115 performs services for the application, renders the results to some shared memory locations in RAM A155, and exits to the monitored mode using the security logic 112. The pre-selected NMI handler location, the secure boot code A120, and the technique by which the security kernel software is loaded and authenticated, are not alterable by the CPU A100 or by any application software.

As described herein, the secure kernel code A120 is maintained in internal memory (either non-volatile memory, or in a volatile memory, in which case it is loaded from external storage and authenticated). The secure mode switch circuit A105 generates the secure mode active signal A160, which enables the CPU A100 to access the non-volatile memory C100 including the secure boot code A115, so that the CPU A100 can execute its instructions, and read and write data using the security information 113.

The secure timer circuit A110 is capable of generating a timer interrupt signal for the CPU A100, in response to parameters set by the secure mode switch circuit A105. The security logic 112 can also generate an NMI signal A165 to the CPU A100 in response to a timeout from a secure timer. In response, the CPU A100 transfers control to a pre-selected timer interrupt handler location in the secure kernel code A120. Neither the pre-selected timer interrupt location nor the secure kernel code A120 is alterable by the CPU A100 or any application software (or any other software maintained in the external storage A150).

In response to the timer interrupt signal A165, and similar to other methods of entering secure mode, the secure processor 110 sets the secure mode active signal A160 to be logical TRUE, with the effect of enabling access to secure portions of the secure chip.

The access control circuit A133 controls access to elements of the secure processor 110 in response to the secure mode active signal A160, by generating the access control signals A163, which are coupled to each element of the secure process 110 for which access control is performed. When the secure mode active signal A160 indicates that the secure processor 110 is in a secure mode, the access control circuit A133 allows the CPU A100 to access all elements of the secure processor 110. When the secure mode active signal A160 indicates that the secure processor 110 is in a monitored mode, the access control circuit A133 allows the CPU A100 to only access backward-compatible monitored-mode portions of the secure processor 110. In a preferred embodiment, these backward-compatible monitored-mode portions exclude the security logic 112 (except for indicating entry into secure mode) and the security data 113.

More specifically, when the secure mode active signal A160 indicates that the secure processor 110 is in a monitored mode, the access control circuit A133 prevents the CPU A100 from accessing the secure mode switch circuit A105 (except for indicating entry into secure mode), the secure timer circuit A110, the secure boot code A115, the secure kernel code A120, the access control circuit A133 itself, the secure mode active signal A160, the access control signals A163, the read-only secure data A125, the R/W volatile secure state value A130, the encryption/decryption keys B101, and the licensing information B102.

3. Security Information

The security information 113 includes a set of read-only secure data A125, a R/W volatile secure state value A130, a set of private (such as from a public key cryptosystem), a set of encryption/decryption keys, a set of optional unique IDs and a set of signature information B101.

The read-only secure data A125 includes a set of secure code, as described herein, such as code available to be executed by the CPU A100 in response to the reset signal A170, optionally in response to the NMI signal A165, in response to the timer interrupt signal A165, or otherwise when the secure mode is entered.

In one embodiment, the read-only secure data A125 includes a set of one or more private keys, and a set of encryption/decryption keys B101, preferably unique to the individual secure processor 110. In such embodiments, the secure processor 110 uses the encryption/decryption keys B101 for decrypting messages from trusted sources using a public-key cryptosystem (such as for example by using a private key of a private/public key pair in a public-key cryptosystem). Alternatively, the secure processor 110 might have another set of code signatures B103, differing from the encryption/decryption keys B101, with which to authenticate trusted sources using other techniques for authentication. Similarly, in such embodiments, the secure processor 110 uses the code signatures B101 for verifying the accuracy of additional secure code to be loaded into memory, such as by noting the correctness of a digital signature or secure hash associated with that additional secure code when received from authenticated trusted sources.

In one embodiment, the read-only secure data A125 also includes a set of key information B102, by which the individual secure processor 110 is able to authenticate sources and verify that the individual secure processor 110 has the right to receive and perform relevant application software. For example, the licensing information B102 might include a signed certificate from a trusted authority, indicating that the individual secure processor 110 is licensed to perform the relevant application software. In such embodiments, in response to the licensing information B102, the authenticated trusted sources provide the relevant capabilities for the secure processor 110 to load and execute application software. In one embodiment, these capabilities include either the application software itself, or a DRM (digital rights management) certificate authorizing the secure processor 110 to load and execute the application software.

The R/W volatile secure state value A130 includes any read/write volatile memory the secure processor 110 needs to execute the secure code. In one embodiment, the secure processor 110 maintains all of its volatile state in the R/W volatile secure state value A130, with the effect that application code cannot access any of the state information used by the secure code. The secure processor 110 also includes, in the secure kernel code A120, instructions performable by the CPU A100 to make relevant authentication and validity checks for any software to be executed by the CPU A100. Maintaining all of the volatile state for the secure processor 110 in the R/W volatile secure state value A130 also has the effect of increasing the work factor for users to attempt to read that state and violate the security of secure mode operation for the secure processor 110. However, in alternative embodiments, the secure processor 110 may maintain at least some of its volatile state in ordinary memory, with the effect that it may be possible for application code to access some of the values associated with that state.

Method of Operation

Figure 2A:
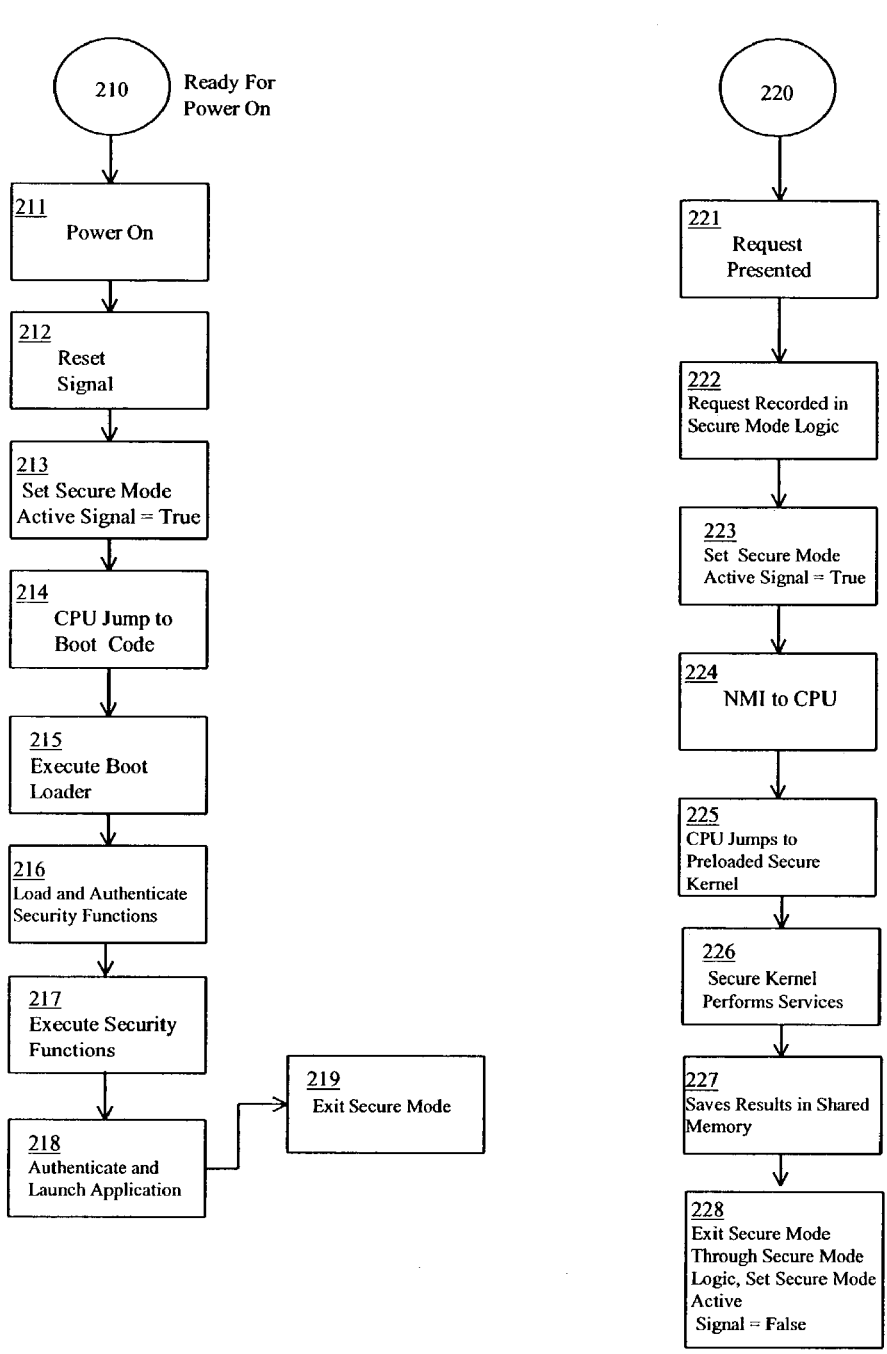
FIGS. 2a and 2b show a process flow diagram of a method of operating a secure processor capable of secure execution.
Figure 2B:
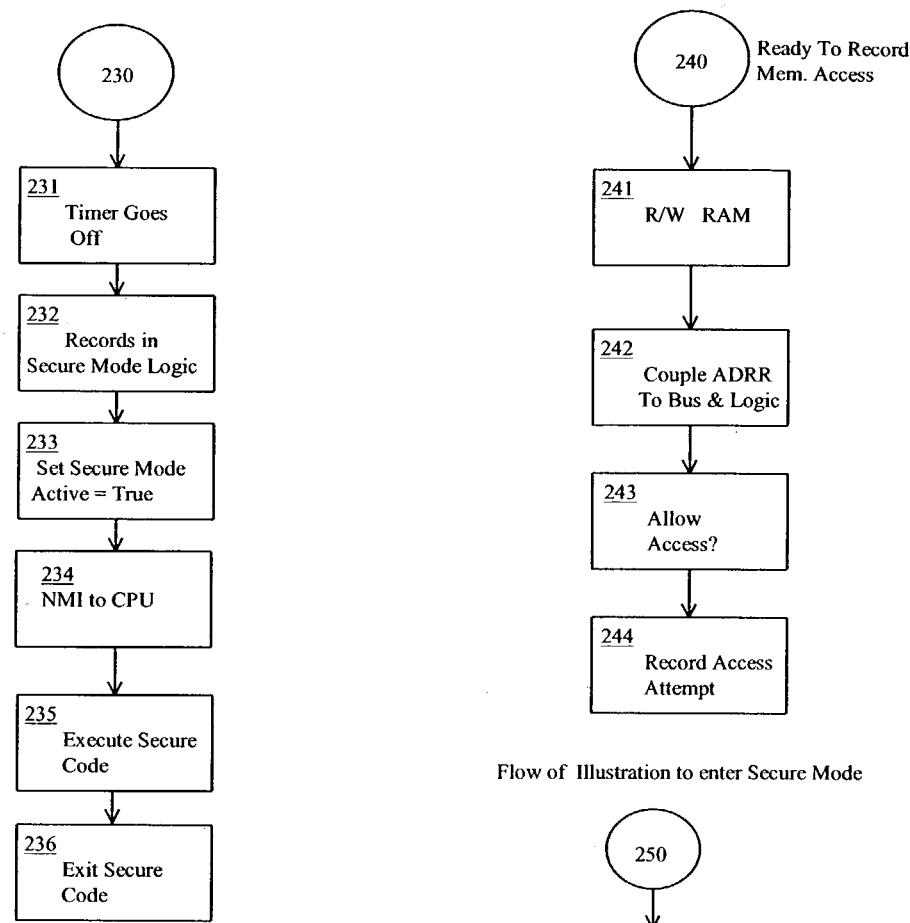
Figure 2B:
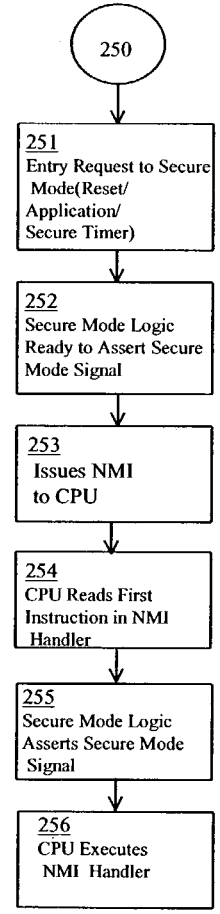

FIG. 2 shows a process flow diagram of a method of operating a secure processor capable of secure execution.

A method 200 is performed by the system 100. Although the method 200 is described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

1. Power On

At a flow point 210, the secure processor 110 is ready for power on.

At a step 211, the secure processor 110 is powered on.

At a step 212, the reset signal A170 is asserted, with the effect of indicating that the secure processor 110 has just been reset. When the secure processor 110 is reset, the secure mode active signal A160 is asserted (that is, set to logical TRUE) and the CPU A100 jumps to (that is, transfers execution control to) the secure boot code A115.

At a step 213, the secure mode switch circuit A105 asserts the secure mode active signal A160, which indicates to the non-volatile memory C100 (FIG. 3) that the CPU A100 is allowed to access the secure boot code A115, execute its instructions, and read and write data using the security information 113. The CPU A100 then transfers control to a pre-selected reset location in the secure boot code A115.

At a step 214, the CPU A100 executes instructions from the secure boot code A115.

At a step 215, the CPU A100 executes the secure boot code A115.

In one embodiment, the following illustrative implementation on a MIPS or MIPS compatible processor results in the entry into secure mode upon reset. This illustrative implementation begins at a flow point 250, and includes actions that would be included in the step 214 and the step 215.

At a step 251, the reset signal causes a request to enter secure mode.

At a step 252, the security logic 112 prepares to set the secure mode signal A165 to logical TRUE, if and only if a subsequent uncached read to the reset location 0x1fbc0000 is made.

At a step 253, the CPU A100 interrupts normal execution to respond to the reset signal.

At a step 254, the CPU A100 attempts to fetch the next instruction from location 0x1fbc0000, with the effect of invoking a reset interrupt handler or NMI interrupt handler.

At a step 255, the security logic 112 sets the secure mode signal A165 to logical TRUE, with the effect of enabling access for secure parts of the chip and the execution of boot secure code.

At a step 256, the CPU A100 proceeds to execute the reset interrupt handler or NMI interrupt handler in the secure boot code A120.

After the execution of the secure boot code A120, the following steps load the security kernel or security functions, if any, from mass storage A150.

The secure boot code A115 reads the security information 113, receives additional cryptographically signed or verifiable instructions, and records those additional instructions in the internal RAM A155. To perform this step, the CPU A100 performs the following sub-steps:

At a sub-step 215, the CPU A100, operating in secure mode executes software (possibly obtained from a server device) from external mass storage A150, after having been loaded and authenticated by secure boot code A120. In one embodiment, the message is encrypted using encryption/decryption keys B101 from the read-only secure data A125, accessible only by the CPU A100 while operating in secure mode.

Although in one embodiment the CPU A100 obtains the additional instructions using the communication link 120, in alternative embodiments the system 100 may obtain additional instructions (either some or all of them) by other means. Some examples, not intended to be limiting in any way, are described herein, including the possibilities of obtaining such additional instructions either (1) by means of physical media, or (2) from a third party, with a DRM (digital rights management) certificate or other capability being obtained from a server device.

Moreover, although in one embodiment the additional instructions are sent in an encrypted form, in alternative embodiments the system 100 may obtain such additional instructions (either some or all of them) in a non-encrypted form, with enforcement of the right to use those additional instructions being managed using a DRM certificate, other capability, or other technique.

At a sub-step 216, the CPU A100, operating in secure mode, also authenticates the software and verifies its integrity with respect to secure information either from within the chip or verified with respect to messages from trusted servers whose trust has in turn been already established by secure software or data. In one embodiment, the CPU A100 performs this authentication sub-step using a public key cryptosystem, including encryption keys or code signatures B101 from the read-only secure data A125, and using information about the trusted server 130 (such as for example a public key for the trusted server 130) included in the encryption/decryption keys B101 or other read-only secure data A125.

At a sub-step 216, the trusted server optionally 130 verifies that the secure processor 110 is authorized to receive application software or other additional instructions from the trusted server 130. In one embodiment, the CPU A100 performs this verification sub-step using a public key cryptosystem, using encryption/decryption keys B101 from the read-only secure data A125, and using licensing information B102 or other information from the read-only secure data A125.

Those of ordinary skill in the art will recognize, after perusal of this application, that many other techniques might be used to authenticate software or data from a server using cryptographic signatures and trusted root keys. Moreover, there is no particular requirement that such authentication need be for only the trusted server 130. In alternative embodiments, it may be that both server and client authenticate each other.

At a sub-step 217, the CPU A100, operating in secure mode, receives the application software or other additional instructions from the trusted server 130, and verifies the accuracy of that application software or those other additional instructions. In one embodiment, the CPU A100 performs this verification sub-step using a public key cryptosystem, using encryption/decryption keys B101 from the read-only secure data A125, or using a secure hash for the application software or other additional instructions from the read-only secure data A125.

At a sub-step 218, the CPU A100, operating in secure mode, records the application software or other additional instructions in RAM A155. A result of this sub-step is that the application software or other additional instructions are ready to be executed by the CPU A100.

Although one example method is described herein for authenticating and loading application software, other and further techniques are also possible for doing so. As described above, in the context of the invention, there is no requirement that authentication of the application software involves any particular technique, and in particular, there is no requirement that authentication of the application software involves interactive communication with the trusted server 130.

In one embodiment, at least some portions of the secure kernel code A120 itself are obtained by the secure processor 110 as such additional instructions. In one embodiment, the following technique might be used:

- At start-up (either power-on or upon receipt of the reset signal), the CPU A100 is forced to perform the secure kernel code A120, which is verified to be correct and secure by secure boot code.
- The CPU A100 performs the secure kernel code A120, after loading program code by a bootstrap loader, with the effect of locating and copying code for performing security functions from mass storage A150, or other external devices, to an internal memory. In one embodiment, the internal memory is an on-chip volatile memory, such as for example an SRAM memory.
- The non-volatile write-once memory C110 (FIG. 3) is initialized, at the time of manufacture of the secure processor chip, with a cryptographically-strong signature value, such as for example a 160-bit secure hash or digest value. In one embodiment, the secure hash or digest value might include an SHA1 secure hash or other known cryptographically-strong signature values. As described herein, construction and initialization of the non-volatile write-once memory prevents it from being modified by application software after manufacture of the secure processor chip.
- The bootstrap loader portion of the secure kernel code A120 computes a signature of the newly loaded program code, and compares that computed signature with a pre-computed signature already internally stored in the non-volatile memory C110. If the computed signature and the pre-computed signature match, the bootstrap loader portion of the secure kernel code A120 concludes that the newly loaded program code is accurate and trustworthy. Upon this conclusion, the CPU A100 is permitted to execute the newly loaded program code in secure mode.
- In one embodiment, the CPU A100 re-verifies the newly loaded program code as being accurate and trustworthy each time it attempts to load additional software intended to be executed in secure mode. For example, not limiting in any way, these cases might include (1) each time a portion of the secure kernel code A120 is loaded from RAM A155, mass storage A150, or any other external device, (2) each time additional software is desired to be loaded and added to the secure kernel code A120, such as for example a new security function or a new function to be provided by the secure kernel code A120.
- As noted herein, in one embodiment, the CPU A100 separately verifies each module of the newly loaded program code as being accurate and trustworthy. For example, not limiting in any way, these cases might include (1) maintaining a separately pre-computed signature for each module, when multiple modules are loaded from RAM A155, mass storage A150, or any other external device, (2) locating a new pre-computed signature in each module for a next such module, when additional software is desired to be loaded in a sequence of modules, (3) maintaining both a separately pre-computed signature for each module, and a pre-computed signature for a set of such modules.

At a step 219, the secure processor 110 exits from the secure mode to the monitored mode. A general illustrative method of exit from secure mode is outlined later herein.

2. Requests for Services

At a flow point 220, the secure processor 110 is executing application software in monitored mode. The secure mode is ready to receive a request for services from the application software.

At a step 221, the application software presents a request for services to the secure processor 110.

At a step 222, in one embodiment, the application software places parameters for the request for services in a set of selected registers in the secure mode logic.

At a step 223, the secure mode logic 112 sets the secure mode signal A160 to logical TRUE.

At a step 224, the secure mode logic 112 generates the NMI interrupt signal A165 to the CPU A100, with the effect that the CPU A100 transfers control to the secure kernel code A120 to satisfy the request for services.

At a step 225, similar to the step 213, the CPU A100 jumps to a pre-selected interrupt handler location in the secure code. The secure mode switch circuit is responsible for A105 asserting the secure mode active signal A160, which enables the CPU A100 to access the secure code, execute its instructions, and read and write data using the security information 113.

At a step 226, similar to the step 214, the CPU A100 executes instructions from the secure code. The secure code handles the NMI interrupt.

In one embodiment, the following illustrative implementation on a MIPS or MIPS compatible processor results in the entry into secure mode at the request of the application code 143. This illustrative implementation begins at a flow point 250.

- The application performs an uncached read to a register in secure mode logic. This "arms" the secure mode logic to conditionally enter secure mode if and only if it encounters a subsequent read from NMI reset location 0×1bfc0000.
- At a step 252, the security logic 112 prepares to set the secure mode signal A165 to logical TRUE, if and only if a subsequent uncached read to the reset location 0×1fbc0000 is made.
- At a step 253, the security logic 112 causes an NMI signal to be asserted to the CPU A100.
- At a step 254, the CPU A100 attempts to fetch the next instruction from location 0×1fbc0000, with the effect of invoking a reset interrupt handler or NMI interrupt handler.
- At a step 255, the security logic 112 sets the secure mode signal A165 to logical TRUE, with the effect of enabling access for secure parts of the chip and the execution of boot secure code.
- At a step 256, the CPU A100 proceeds to execute the reset interrupt handler or NMI interrupt handler in the secure code A120.

In one embodiment, a register in the secure mode logic is reserved to indicate the reason for entry into secure mode; for example, due to a reset, due to a request from the application code, and the like.

The secure kernel determines the cause of entry to secure mode and performs the services requested by the application by possibly reading restricted areas of the chip, and returns the result to a memory area shared with the application.

After performing the requested operation, the secure kernel triggers a defined exit sequence (as described below) through the secure mode logic and returns to the application code 143.

At a step 227, the secure processor 110 saves a result of the requested operation in a shared memory, such as the RAM A155.

In one embodiment, the request for services presented by the application software might include a request to perform an I/O operation. In such embodiments, the secure processor 110 reserves at least some I/O operations to be performed in secure mode, with the effect that the application software cannot perform those I/O operations without assistance from secure code.

The application software presents a request for services, indicating by the parameters associated with the request that the requested service is an I/O operation. The parameters associated with the request follow an API (application programming interface) selected for the secure processor 110 by its designers, preferably to operate in cooperation with the application software without substantial change in the application software.

In one embodiment, the request for services presented by the application software might include a request to load additional software. In such embodiments, the secure processor 110 performs steps similar to the step 214 and its sub-steps. Accordingly, in the system 100, in sub-steps similar to those of the step 214, the CPU A100 authenticates the server device as a trusted server 130, the CPU A100 receives or loads the additional software, either from mass storage A150 from the trusted server 130, and the CPU A100 records the additional software in RAM A155 after verifying the authenticity and integrity of such software.

Error traps or I/O emulation can be handled by the same illustrative mechanism above through the secure mode logic. The secure mode logic forces the CPU to enter secure mode in those cases and execute pre-authenticated software to handle error traps or I/O requests as necessary.

At a step 228, the secure processor 110 exits from the secure mode to the monitored mode. A general illustrative method of exit from secure mode is outlined later herein.

3. Timer Interrupts

At a flow point 230, the secure processor 110 has set a timer that might interrupt application software executing in monitored mode, and the timer is ready to go off.

At a step 231, similar to the step 221, the timer goes off, and the application software is interrupted.

At a step 232, similar to the step 222, the timer interrupt signal A165 is asserted, with the effect of indicating that processing on the secure processor 110 has just been interrupted.

One illustrative method of the implementation of the secure timer trap on a MIPS or MIPS compatible processor is as follows. This illustrative method is similar to the steps beginning with the flow point 250.

The secure timer is programmed in the CPU reset secure boot software to count down to zero and reset to a value that determines the periodicity of the secure time trap. This mechanism is not maskable or interruptible by any application software, and runs continuously while the application continues to execute.

The timer counts down from the programmed setting and upon reaching zero, triggers an NMI signal A165 to the CPU (which interrupts its execution path), and arms the secure mode logic to conditionally assert the secure mode active signal if an only if a subsequent uncached read request is made to the NMI routine location.

The CPU jumps to execute the NMI routine where the secure kernel resides to perform the desired action upon timer interrupt.

The secure mode logic, upon acknowledging the read to the NMI location, sets secure mode active signal to true and permits access to secure regions of the chip.

The secure kernel routine responsible for handling the timer trap performs its operation and finally exits secure mode again through the secure mode logic.

At a step 236, the CPU A100 exits the secure code, and returns to the application software execution point. The secure mode switch circuit A105 de-asserts the secure mode active signal A160, with the effect of indicating that the CPU A100 is no longer allowed to access the secure code, execute its instructions, or read and write data using the security information 113.

4. Monitored Memory Access

At a flow point 240, the secure processor 110 is ready to record accesses to external memory by application software executing in monitored mode.

At a step 241, the CPU A100 attempts to read from or write to RAM A155. To perform this step, the CPU A100 sends a memory address to the CPU memory interface A103.

At a step 242, the CPU memory interface A103 couples that memory address to the internal bus 114, which couples that memory address to the memory interface A140 and to the security logic 112.

At a step 243, the security logic 112, including the access control circuit A133, determines if the CPU A100 should be allowed to access that memory address in the RAM A155. In one embodiment, the CPU A100 is generally always allowed to access any memory address in the RAM A155. However, in alternative embodiments, the access control circuit A133 might restrict the CPU A100 from accessing selected memory addresses, with the effect of isolating selected portions of the RAM A155 from when the CPU A100 is operating in monitored mode.

At a step 244, the security logic 112, including the access control circuit A133, records the attempt to access that memory address in the RAM A155 by the CPU A100. In one embodiment, the CPU A100 records only selected such memory addresses. For one example, not limiting in any way, the access control circuit A133 might select one or more portions of the RAM A155 for which to record accesses when the CPU A100 is operating in monitored mode. However, in alternative embodiments, the access control circuit A133 may attempt to record all such memory accesses, may attempt to record memory accesses in response to a pattern thereof, or may attempt to record memory accesses in response to some other criteria selected by the CPU A100 operating in secure mode. The application specific restriction information could be loaded by the security software during application launch with the usual authentication checks on the restrictions.

In one embodiment, a method of implementation of the exit from secure mode in any of the above mechanisms.

The register indicating the reason for entry into secure mode is cleared.

The software clears all caches or internal memory regions used to execute secure kernel software.

The secure kernel software returns from NMI routine.

Non-Volatile Memory

Figure 3:
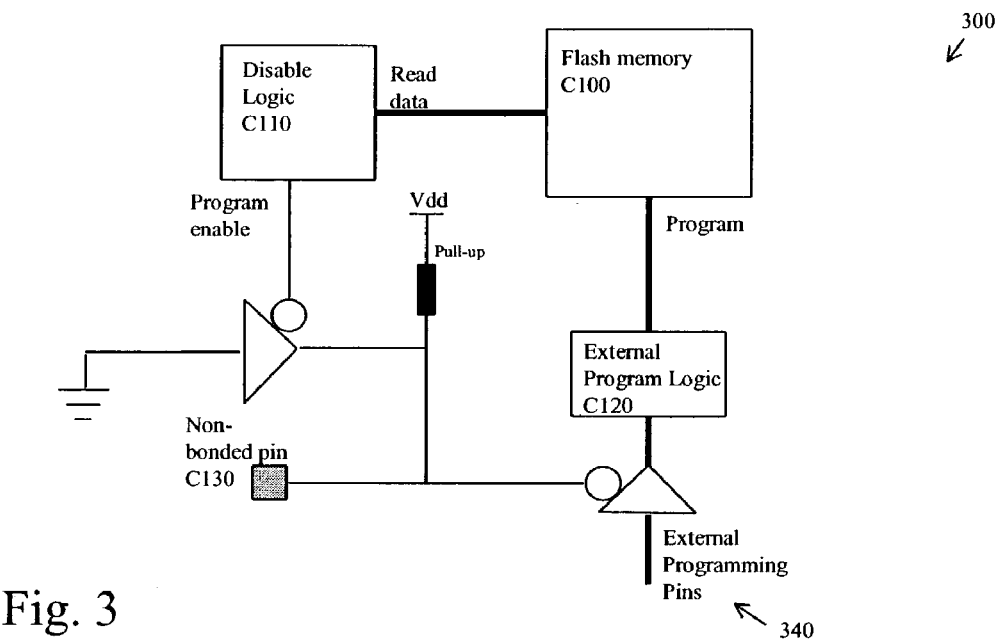
FIG. 3 shows a block diagram of a circuit including a device for programming a non-volatile memory in a substantially non-erasable way.

FIG. 3 shows a block diagram of a circuit including a device for programming a non-volatile memory in a substantially non-erasable way.

A circuit 300 includes a non-volatile memory C100, a disable logic circuit C110, an external program logic circuit C120, a non-bonded pin C130, and a set of external programming pins 340.

In one embodiment, the non-volatile memory C100 includes a flash memory or other memory capable of being electrically programmed, and capable of being read, with the effect that the circuit 300 can determine whether the non-volatile memory C100 has been programmed with data or not. In the context of the invention, there is no particular requirement that the non-volatile memory C100 includes any particular memory technology, so long as it can perform the functions described herein.

The disable logic circuit C110 is coupled to the external program logic circuit C120, with the effect that when the program enable signal from the disable logic circuit C110 is turned off, inputs to the external program logic circuit C120 are disabled and the non-volatile memory C100 cannot be electrically programmed from the external programming pins.

The disable logic circuit C110 is also coupled to the non-volatile memory C100, and is capable of reading values from the non-volatile memory C100 and comparing those values with a program enable signature value, with the effect that the disable logic circuit C110 can determine if the non-volatile memory C100 has been initially programmed or not. If the non-volatile memory C100 has been initially programmed with a program enable signature value, the disable logic circuit C110 causes inputs to the external program logic circuit C120 to be enabled, with the effect that the non-volatile memory C100 can be electrically programmed. If the program enable signature value is not present the program enable output from the disable logic C110 will be disabled.

The non-bonded pin C130 includes an electrically conducting pad, located on the secure processor chip die and capable of being probed before the die is packaged, but not bonded to any external wiring or packaging. This has the effect that the non-bonded pin C130 can be electrically coupled to external circuitry when the secure processor chip is manufactured, but that after manufacture and packaging, the non-bonded pin C130 is substantially unable to be electrically coupled to any external circuitry. Thus, after manufacture and before packaging of the secure processor chip, the non-bonded pin C130 is available for use when programming the non-volatile memory C100, but when manufacture and packaging are completed, the non-bonded pin C130 is no longer available for use when programming the non-volatile memory C100, with the effect that the non-volatile memory C100 cannot be externally programmed.

On wafer test after manufacture, the non-bonded pin C130 is coupled to a selected voltage (logic "0"), with the effect that the external program logic circuit C120 is enabled and the non-volatile memory C100 can be electrically programmed, regard-less of the state of the program enable output from the disable logic C110.

Method of Recording Unique Information

Figure 4:
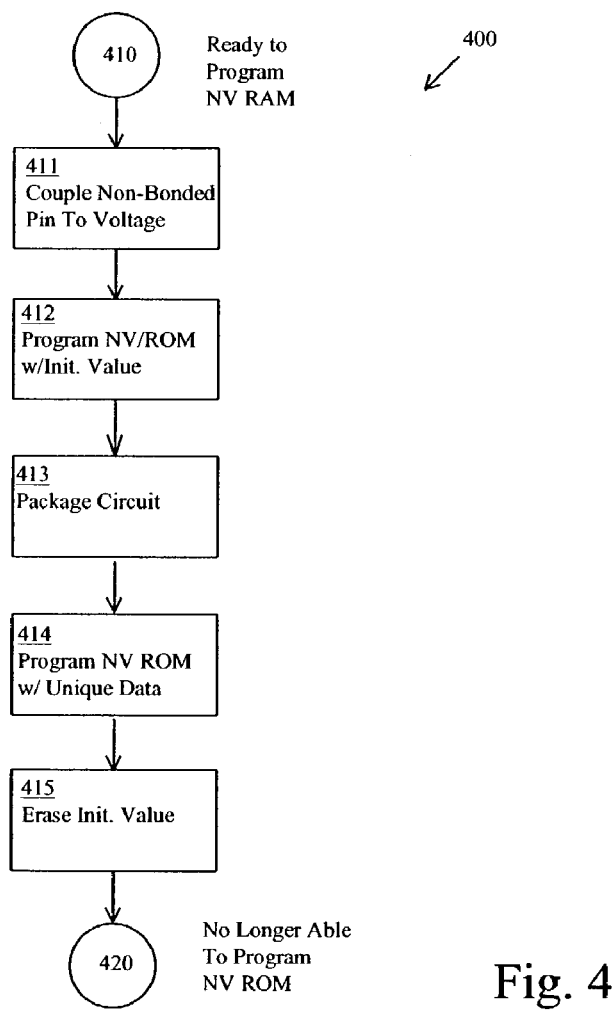
FIG. 4 shows a process flow diagram of a method of operating a circuit including a device for programming a non-volatile memory in a substantially non-erasable way.

FIG. 4 shows a process flow diagram of a method of operating a circuit including a device for programming a non-volatile memory in a substantially non-erasable way.

A method 400 is performed with regard to the circuit 300 when constructing the secure processor 110. Although the method 400 is described serially, the flow points and steps of the method 400 can be performed by separate elements in conjunction or in parallel, whether asynchronously or synchronously, in a pipelined manner, or otherwise. There is no particular requirement that the method 400 must be performed in the same order in which this description lists flow points or steps, except where explicitly so indicated.

At a flow point 410, the non-volatile memory C100 in the secure processor 110 is ready to be programmed. In one embodiment, a result of the method is to cause security information unique to that particular secure processor 110 to be recorded in a non-volatile memory.

At a step 411, the non-bonded pin C130 is coupled to a selected voltage (logic "0"), with the effect that the external program logic circuit C120 is enabled and the non-volatile memory C100 can be electrically programmed.

At a step 412, the non-volatile memory C100 is electrically programmed with an initial program enable signature value (disposed in its last memory location), with the effect that the non-volatile memory C100 is ready to be further programmed.

At a step 413, the circuit 300 is packaged, with the effect that the non-bonded pin C130 is no longer available for coupling to external circuitry.

At a step 414, the non-volatile memory C100 is electrically programmed.

In one embodiment, when this step is performed, security information 113 unique to the particular instance of the secure processor 110 is recorded in the non-volatile memory C100. This has the effect that the particular instance of the secure processor 110 becomes uniquely distinguishable from each other instance of the secure processor 110, and can uniquely identify itself to trusted servers 130.

At a step 415, the non-volatile memory C100 is further electrically programmed to erase the program enable signature value. When the program enable signature value is no longer present, the disable logic circuit C110 determines that the non-volatile memory C100 is no longer available for programming, and causes the external program logic circuit C120 to be disabled. This has the effect that the non-volatile memory C100 can no longer be further electrically programmed from the external programming pins.

At a flow point 420, the non-volatile memory C100 no longer includes the program enable signature value, the disable logic circuit C110 determines that the non-volatile memory C100 is no longer available for programming, and the disable logic circuit C110 causes the external program logic circuit C120 to be disabled. On power-up for the secure processor 110, the non-volatile memory C100 can no longer be further electrically programmed from the external programming pins.

ALTERNATIVE EMBODIMENTS

Although preferred embodiments are disclosed herein, many variations are possible which remain within the concept, scope, and spirit of the invention. These variations would become clear to those skilled in the art after perusal of this application.

There is no particular requirement that all executable code, or even all secure code, need be present on the chip on which the secure processor 110 is integrated. In alternative embodiments, the secure processor 110 may involve secure code or other executable code maintained in the external RAM A155, in the mass storage A150, or in other external devices.

There is no particular requirement that the secure processor 110 need be implemented as a single integrated chip. In alternative embodiments, the secure processor 110 may include multiple devices, coupled using signals that are either encrypted or otherwise secured against snooping or tampering.

There is no particular requirement that all secure code need be loaded all at once. In alternative embodiments, the secure processor 110 may involve multiple segments of secure code, which are loaded and verified at different times, such as in a sequence, or such as on an on-demand basis. For a first example, not intended to be limiting in any way, the secure kernel code A120 might include signatures of one or more modules of additional software to be loaded and integrated into the instructions performed by the CPU A100 when operating in secure mode. For a second example, not intended to be limiting in any way, the secure kernel code A120 might include signatures of one or more modules of additional software to be loaded, each of which itself includes signatures of one or more modules of additional software to be loaded.

Memory and mass storage access checks might be performed in response to selected events. For a first example, not intended to be limiting in any way, these selected events might include any request for encryption/decryption services, I/O services, or secure signature or verification services by the application software. For a second example, not intended to be limiting in any way, these selected events might include periodic intercepts of memory of mass storage access (such as every $N^{th}$ access, for a selected value of N), periodic timer interrupts, and the like.

Authentication and verification checks might be performed in response to selected events, similar to memory or mass storage access checks. For a first example, not intended to be limiting in any way, these selected events might include any request for encryption/decryption services, I/O services, or secure signature or verification services by the application software. For a second example, not intended to be limiting in any way, these selected events might include periodic intercepts of memory of mass storage access (such as every $N^{th}$ access, for a selected value of N), periodic timer interrupts, and the like.

The secure kernel code A120 might offer additional security services, besides those mentioned herein above, to the application software. For example, not intended to be limiting in any way, these additional services might include authentication and verification of messages from servers (other than the trusted server 130, which is already described above) and other messaging partners (such as in peer-to-peer protocols and such as in protocols in which the application software has the role of a server), encryption/decryption of messages exchanged with servers (other than the trusted server 130, which is already described above) and other messaging partners, public-key signature of messages exchanged with servers (other than the trusted server 130, which is already described above) and other messaging partners, authentication and verification of further additional software to load and execute from secondary trusted servers 130, management of DRM licensing information, periodic (or in response to selected events, as noted above) authentication and verification of software loaded for execution by the CPU A100, and the like.

The secure kernel code A120 might offer additional services other than those related to security, besides those mentioned herein above, to the application software. For example, not intended to be limiting in any way, these additional services might include specific device drivers or operation of specific hardware for which the application software is licensed to operates, and the like.

Those skilled in the art will recognize, after perusal of this application, that these alternative embodiments and variations are illustrative and are intended to be in no way limiting.

The invention claimed is:

1. A method including steps of
performing application software by a single-processor processing unit;
verifying that said single-processor processing unit is authorized to perform said application software;
distinguishing for said single-processor processing unit between a monitored mode and a secure mode;
switching from said monitored mode to said secure mode in response to a non-maskable interrupt (NMI) signal;
wherein
in said monitored mode said single-processor processing unit is capable of performing said application software transparently to said application software,
in said secure mode said single-processor processing unit is capable of verifying, using persistent memory internal to the single-processor processing unit, that said single-processor processing unit is authorized to perform said application software,
wherein said single-processor processing unit performs the application software and verifies that said single-processor processing unit is authorized to perform said application software.

2. A method as in claim 1, including steps of
in said monitored mode, performing by a portion of said single-processor processing unit instructions substantially identically to those performable by a semiconductor die for an ordinary processor otherwise not responsive to said secure mode.

3. A method as in claim 1, including steps of
in said secure mode, performing by said single-processor processing unit extraordinary services requested by, and authorized for, said application software.

4. A method as in claim 1, including steps of
interrupting said monitored mode and entering said secure mode in response to at least one of a plurality of techniques; and
when in said secure mode, determining by which technique said secure mode was entered.

5. A method as in claim 1, including steps of
generating the NMI signal using a timer, reset, or other programming.

6. A method as in claim 1, including steps of
in said secure mode, exiting said secure mode and performing said application software in said monitored mode.

7. A method as in claim 6, including steps of
performing said application software without substantial change in original code for that application software,
whereby the application software sees a processor environment that is not substantially different from an ordinary processor.

8. A method as in claim 6, including steps of
when said application software needs services the secure processor oversees, the application software generates an interrupt, causing the secure mode to be re-entered, the services to be delivered to the application software, and the secure mode to be exited, whereby the application software can continue to execute in monitored mode.

9. A method as in claim 1, including steps of performing instructions in said secure mode in a power-on state.

10. A method as in claim 9, including steps of
in response to said power-on state, performing secure code maintained in a persistent memory internal to a chip including said single-processor processing unit, said steps of performing secure code including steps of
loading additional code from one or more trusted sources;
verifying authenticity of said trusted sources; and
verifying content integrity of said additional code.

11. A method as in claim 9, including steps of
in response to said power-on state, performing secure code maintained in a persistent memory internal to a chip including said single-processor processing unit, said steps of performing secure code including steps of
loading additional code from one or more trusted sources;
verifying authenticity of said trusted sources; and
verifying content integrity of said additional code;
wherein said steps of verifying authenticity and content integrity are performed in response to said persistent memory internal to said chip.

12. A method as in claim 9, including steps of
in response to said power-on state, performing secure code maintained in a persistent memory internal to a chip including said single-processor processing unit, said steps of performing secure code including steps of
loading additional code from one or more trusted sources;
verifying authenticity of said trusted sources;
verifying content integrity of said additional code;
wherein
said steps of verifying authenticity and content integrity are performed in response to said persistent memory internal to said chip, and
said persistent memory internal to said chip includes at least one of: encryption keys, secure hash values, or other data for verification of said trusted sources and authentication of said additional code.

13. A method as in claim 1, wherein said application software includes at least one instruction for execution in said secure mode.

14. A method as in claim 13, wherein said at least one instruction for execution in said secure mode includes an additional function performable by said single-processor processing unit on behalf of a set of secure kernel code.

15. A method as in claim 13, wherein said at least one instruction for execution in said secure mode includes an additional function performable by said single-processor processing unit on behalf of a set of secure kernel code, said additional function including authenticating additional secure kernel code.

16. A method as in claim 1, wherein said steps of verifying include performing a set of secure software, said set of secure software including determining whether said single-processor processing unit is authorized to perform a set of additional secure software for execution in said secure mode.

17. A method as in claim 16, wherein said additional secure software includes
at least one function for loading additional secure software; and
at least one function for verifying that said single-processor processing unit is authorized to perform said additional secure software.

18. A method as in claim 16, wherein said additional secure software includes
at least one function for loading application software; and
at least one function for verifying that said single-processor processing unit is authorized to perform said application software.

19. A method including steps of
performing instructions by a single-processor processing unit, said single-processor processing unit including a security signal having at least a secure mode and a monitored mode;
switching from said monitored mode to said secure mode in response to a non-maskable interrupt (NMI) signal;
accessing, by said single-processor processing unit, at least one secure function in response to said security signal when said security signal indicates said secure mode, and refusing to access said secure function in response to said security signal when said security signal indicates said monitored mode;
wherein said secure function includes steps of recording external instructions in response to an external source, a measure of trustworthiness of said external source being verifiable by said single-processor processing unit, using persistent memory internal to the single-processor processing unit;
wherein said performing instructions and said accessing at least one secure function are performed by said single-processor processing unit.

20. A method as in claim 19, including steps of allowing said single-processor processing unit to access at least one secure circuit coupled to said single-processor processing unit only when said security signal indicates said secure mode.

21. A method as in claim 19, including steps of
performing a set of application code maintained in memory or mass storage, said memory or mass storage coupled to said single-processor processing unit, said steps of performing being done without substantial change from said application code being performed on a substantially identical non-secure processing unit not responsive to said security signal.

22. A method as in claim 19, including steps of
performing, by said single-processor processing unit, a set of application code maintained in memory or mass storage, coupled to said single-processor processing unit, when said single-processor processing unit is operating in said monitored mode.

23. A method as in claim 19, wherein said one secure function includes steps of
receiving said external instructions from said external source; and
verifying said external instructions as substantially accurate.

24. A method as in claim 19, including steps of
monitoring access by said single-processor processing unit to an external device;
said steps of monitoring being responsive to said security signal and to a set of access rules, wherein when said single-processor processing unit attempts to access said external device in violation of said access rules, performing at least one secure function in response thereto.

25. A method as in claim 24, wherein said steps of monitoring are responsive to access by said single-processor processing unit, in response to at least one of
   a number of accesses requested by said single-processor processing unit;
   a number of instructions which said single-processor processing unit performs;
   a parameter set by said single-processor processing unit which operating in said secure mode; or
   an interval during which said single-processor processing unit is operating.

26. A method as in claim 19, including steps of maintaining a set of secure information for read-only access by said single-processor processing unit.

27. A method as in claim 26, wherein said steps of maintaining include steps of reading said set of secure information from a non-volatile memory.

28. A method as in claim 26, wherein said steps of maintaining include steps of reading said set of secure information from a non-volatile memory, and including steps of disabling writing of said non-volatile memory when said secure processor is packaged.

29. A method as in claim 26, wherein said steps of maintaining include steps of reading said set of secure information from a non-volatile memory, and including steps of disabling writing of said non-volatile memory when said secure processor is packaged, said steps of disabling including making substantially inaccessible a non-bonded pin.

30. A method as in claim 26, wherein said steps of maintaining include steps of reading said set of secure information from a non-volatile memory, and wherein said set of secure information is unique to said secure processor.

31. A method as in claim 19, wherein said one secure function includes steps of
   receiving said external instructions from said external source;
   constructing data responsive to said external instructions; and
   comparing said data responsive to said external instructions with at least some of said secure information, whereby said single-processor processing unit is capable of verifying that said external instructions are accurate.

32. A method as in claim 31, wherein
   said steps of constructing include determining a computed signature value in response to said external instructions; and
   said steps of comparing include attempting to match said computed signature value against a recorded signature value included in said secure information.

33. A method as in claim 31, wherein said steps of receiving include at least one of
   receiving a set of messages, said set of messages collectively including said external instructions; or
   receiving a set of storage media, said set of storage media collectively including said external instructions.

34. A method as in claim 19, wherein said one secure function includes steps of
   requesting said external instructions from said external source;
   sending data responsive to said secure information to said external source, whereby said external source is capable of verifying that said single-processor processing unit is authorized to perform said external instructions; and
   receiving said external instructions from said external source.

35. A method as in claim 34, wherein said external instructions include at least one of: application software, additional secure code.

36. A method embodied on a single processor, including steps of
   performing instructions on a processor, said processor having a secure mode and a monitored mode;
   wherein when said processor executes in said secure mode, said processor has access to at least one secure function to which said processor does not have access to when said processor executes in said monitored mode;
   wherein said processor executes in said secure mode during an interrupted state, said interrupted state being responsive to a non-maskable interrupt (NMI);
   wherein when said processor enters said secure mode, said processor transfers control to a set of secure code, said secure code not being alterable when said processor executes in said monitored mode; and
   wherein a set of said secure code associated with said startup state includes instructions performable by said processor and directing said processor to add external instructions to secure code in response to an external source of said external instructions, a measure of trustworthiness of said external source being verifiable by said processor in response to a set of secure information;
   wherein said single processor performs the instructions and has access to the at least one secure function.

37. Apparatus including
   a single-processor processing unit capable of performing application software, and capable of verifying that said single-processor processing unit is authorized to perform said application software;
   said single-processor processing unit having a monitored mode and a secure mode, wherein in said monitored mode said single-processor processing unit is capable of performing said application software transparently to said application software, and wherein in said secure mode said single-processor processing unit is capable of verifying, using persistent memory internal to the single-processor processing unit, that said single-processor processing unit is authorized to perform said application software;
   a secure mode switch that generates a non-maskable interrupt (NMI) signal, wherein the single-processor processing unit enters secure mode in response to the NMI signal;
   wherein said single-processor processing unit performs the application software and verifies that said single-processor processing unit is authorized to perform said application software.

38. Apparatus as in claim 37, wherein a portion of said single-processor processing unit capable of performing instructions in said monitored mode is substantially identical to a semiconductor die for an ordinary processor otherwise not responsive to said secure mode.

39. Apparatus as in claim 37, wherein in said secure mode said single-processor processing unit is capable of performing extraordinary services requested by, and authorized for, said application software.

40. Apparatus as in claim 37, wherein said single-processor processing unit is capable of interrupting said monitored mode and entering said secure mode in response to at least one of a plurality of techniques, wherein when in said secure mode said single-processor processing unit is capable of determining by which technique said secure mode was entered.

41. Apparatus as in claim 37, wherein said single-processor processing unit is capable of interrupting said monitored mode and entering said secure mode in response to at least one of: an interrupt, a reset signal, or a timer.

42. Apparatus as in claim 37, wherein in said secure mode said single-processor processing unit is capable of exiting said secure mode and performing said application software in said monitored mode.

43. Apparatus as in claim 42, wherein said application software executes without substantial change in original code for that application software, whereby the application software sees a processor environment that is not substantially different from an ordinary processor.

44. Apparatus as in claim 42, wherein when said application software needs services the secure processor oversees, the application software generates an interrupt, causing the secure mode to be re-entered, the services to be delivered to the application software, and the secure mode to be exited, whereby the application software can continue to execute in monitored mode.

45. Apparatus as in claim 37, wherein said application software includes at least one instruction for execution in said secure mode.

46. Apparatus as in claim 45, wherein said at least one instruction for execution in said secure mode includes an additional function performable by said single-processor processing unit on behalf of a set of secure kernel code.

47. Apparatus as in claim 45, wherein said at least one instruction for execution in said secure mode includes an additional function performable by said single-processor processing unit on behalf of a set of secure kernel code, said additional function including authenticating additional secure kernel code.

48. Apparatus as in claim 37, wherein said single-processor processing unit is capable of performing secure software, said secure software including at least one function for authenticating additional software for execution in said secure mode.

49. Apparatus as in claim 48, wherein said secure software includes
at least one function for loading additional secure software; and
at least one function for verifying that said single-processor processing unit is authorized to perform said additional secure software.

50. Apparatus as in claim 48, wherein said secure software includes
at least one function for loading application software; and
at least one function for verifying that said single-processor processing unit is authorized to perform said application software.

51. Apparatus as in claim 37, wherein said single-processor processing unit performs instructions in said secure mode in a power-on state.

52. Apparatus as in claim 51, wherein said single-processor processing unit, in response to said power-on state, performs secure code maintained in a persistent memory internal to a chip including said single-processor processing unit, wherein said secure code includes instructions directing said single-processor processing unit to perform steps of
loading additional code from one or more trusted sources;
verifying authenticity of said trusted sources; and
verifying content integrity of said additional code.

53. Apparatus as in claim 51, wherein said single-processor processing unit, in response to said power-on state, performs secure code maintained in a persistent memory internal to a chip including said single-processor processing unit, wherein said secure code includes instructions directing said single-processor processing unit to perform steps of
loading additional code from one or more trusted sources;
verifying authenticity of said trusted sources; and
verifying content integrity of said additional code;
wherein said steps of verifying authenticity and content integrity are performed in response to said persistent memory internal to said chip.

54. Apparatus as in claim 51, wherein said single-processor processing unit, in response to said power-on state, performs secure code maintained in a persistent memory internal to a chip including said single-processor processing unit, wherein said secure code includes instructions directing said single-processor processing unit to perform steps of
loading additional code from one or more trusted sources;
verifying authenticity of said trusted sources; and
verifying content integrity of said additional code;
wherein
said steps of verifying authenticity and content integrity are performed in response to said persistent memory internal to said chip, and
said persistent memory internal to said chip includes at least one of: encryption keys, secure hash values, or other data for verification of said trusted sources and authentication of said additional code.

55. Apparatus including
a single-processor processing unit capable of performing instructions;
a security signal having at least a secure mode and a monitored mode;
a circuit for switching from said monitored mode to said secure mode in response to a non-maskable interrupt (NMI) signal;
said single-processor processing unit being responsive to said security signal, wherein said single-processor processing unit has access to at least one secure function when performing instructions in said secure mode that said single-processor processing unit does not have access to when performing instructions in said monitored mode;
wherein at least one said secure function includes instructions directing said single-processor processing unit to record external instructions in response to an external source, a measure of trustworthiness of said external source being verifiable by said single-processor processing unit;
wherein said single processor performs instructions and has access to the at least one secure function.

56. Apparatus as in claim 55, including
a security element responsive to said security signal and coupled to at least one secure circuit coupled to said single-processor processing unit, wherein said security element allows said single-processor processing unit to access said secure circuit only when said security signal indicates said secure mode.

57. Apparatus as in claim 55, including
a set of application code maintained in memory or mass storage, coupled to said single-processor processing unit;

whereby said single-processor processing unit performs said application code in said monitored mode.

58. Apparatus as in claim 55, including
a set of application code maintained in memory or mass storage, coupled to said single-processor processing unit, said application code being capable of being performed on a substantially identical non-secure processing unit not responsive to said security signal;
whereby said single-processor processing unit is capable of performing said application code without substantial change, in response to said security signal indicating said secure mode.

59. Apparatus as in claim 55, wherein said one secure function includes instructions directing said single-processor processing unit to perform steps of
receiving said external instructions from said external source; and
verifying said external instructions as accurate.

60. Apparatus as in claim 55, including
a monitoring circuit coupled to said single-processor processing unit, said monitoring circuit capable of monitoring access by said single-processor processing unit to an external device;
said monitoring circuit being responsive to said security signal and to a set of access rules, wherein when said single-processor processing unit attempts to access said external device in violation of said access rules, said monitoring circuit is capable of performing at least one secure function in response thereto.

61. Apparatus as in claim 60, wherein said monitoring circuit is responsive to access by said by said single-processor processing unit, in response to at least one of
a number of accesses requested by said single-processor processing unit;
a number of instructions which said single-processor processing unit performs;
a parameter set by said single-processor processing unit which operating in said secure mode; or
an interval during which said single-processor processing unit is operating.

62. Apparatus as in claim 55, including a set of secure information available for read-only access by said single-processor processing unit.

63. Apparatus as in claim 62, wherein said set of secure information includes information maintained in a non-volatile memory.

64. Apparatus as in claim 62, wherein said set of secure information includes information maintained in a non-volatile memory and unique to said secure processor.

65. Apparatus as in claim 62, wherein said set of secure information includes information maintained in a non-volatile memory, said non-volatile memory having a circuit capable of enabling writing of said non-volatile memory, said circuit being disabled when said secure processor is packaged.

66. Apparatus as in claim 62, wherein said set of secure information includes information maintained in a non-volatile memory, said non-volatile memory having a circuit capable of enabling writing of said non-volatile memory, said circuit including a pin which is substantially inaccessible when said secure processor is packaged.

67. Apparatus as in claim 66, wherein said set of secure information includes an identity value substantially unique to said chip, or a set of private key information substantially unique to said chip; whereby said chip can assure that a selected set of content or software can only be executed by said chip when said chip is authorized to consume said content or execute said software.

68. Apparatus as in claim 67, wherein said chip can verify authenticity of a purchase receipt or license or other digital rights management data, whereby said chip can verify that a selected set of content or software is authentic and authorized for said chip.

69. Apparatus as in claim 68, wherein said secure chip is capable of permitting consumption of said content or execution of said software in response to an attempt to verify authenticity of a purchase receipt or license or other digital rights management data.

70. Apparatus as in claim 68, wherein said receipt includes
information sufficient to substantially identify said chip;
information sufficient to substantially identify an identity value substantially unique to said content or software.

71. Apparatus as in claim 66, including means for combining said key information and said substantially unique identity value, with the effect of implementing a digital rights management scheme for enforcing intellectual property.

72. Apparatus as in claim 66, wherein at least a portion of said secure information is digitally signed using either a public key/secret private key system or a symmetric encryption/decryption key.

73. Apparatus as in claim 72, wherein said secure chip is capable of permitting consumption of said content or execution of said software in response to verifying said digital signature.

74. Apparatus as in claim 66, wherein at least a portion of said secure information is encrypted using either a public key/secret private key system or a symmetric encryption/decryption key.

75. Apparatus as in claim 74, wherein said secure chip is capable of permitting consumption of said content or execution of said software in response to an attempt to decrypt said portion of said secure information.

76. Apparatus as in claim 55, wherein said one secure function includes instructions directing said single-processor processing unit to perform steps of
receiving said external instructions from said external source;
constructing data responsive to said external instructions; and
comparing said data responsive to said external instructions with at least some of said secure information, whereby said single-processor processing unit is capable of verifying that said external instructions are accurate.

77. Apparatus as in claim 76, wherein
said steps of constructing include determining a computed signature value in response to said external instructions; and
said steps of comparing include attempting to match said computed signature value against a recorded signature value included in said secure information.

78. Apparatus as in claim 76, wherein said steps of receiving include at least one of
receiving a set of messages, said set of messages collectively including said external instructions; or
receiving a set of storage media, said set of storage media collectively including said external instructions.

79. Apparatus as in claim 55, wherein said one secure function includes instructions directing said single-processor processing unit to perform steps of requesting said external instructions from said external source; sending data responsive to said secure information to said external source, whereby said external source is capable of verifying that said single-processor processing unit is authorized to perform said external instructions; and receiving said external instructions from said external source.

80. Apparatus as in claim 79, wherein said external instructions include at least one of: application software, additional secure code.

81. Apparatus as in claim 55, wherein
said security signal is responsive to either a reset state or an interrupt state, said interrupt state being responsive to either a non-maskable interrupt or a timer interrupt; and in response to said security signal, said single-processor processing unit transfers control to said secure function, said secure function not being alterable when said single-processor processing unit performs instructions in said monitored mode.

82. Apparatus as in claim 81, wherein, in response to said secure function, said single-processor processing unit transfers control to an exit function, said exit function being capable of removing any secure information from use by said single-processor processing unit when in said monitored mode.

83. Apparatus as in claim 81,
wherein said single-processor processing unit is capable of passing parameters for said secure function,
whereby in response to said non-maskable interrupt, said secure function performs at least one said secure function at the behest of application software, said application software being performed by said single-processor processing unit in said monitored mode.

84. Apparatus as in claim 81,
wherein said single-processor processing unit is capable of passing parameters for said secure function,
whereby in response to said non-maskable interrupt, said secure function performs at least one said secure function at the behest of application software, said application software being performed by said single-processor processing unit in said monitored mode; and
wherein said secure function includes at least one of the following functions: a cryptographic authentication function, a cryptographic signature function, a cryptographically secure function, an encryption or decryption function, a function including an encryption or decryption key, a secure hash function.

85. Memory or mass storage in a processing unit including instructions capable of being interpreted by a computing device to perform steps of
performing application software by a single-processor processing unit;
verifying, using persistent memory internal to the single-processor processing unit, that said single-processor processing unit is authorized to perform said application software;
distinguishing for said single-processor processing unit between a monitored mode and a secure mode, wherein in said monitored mode said single-processor processing unit is capable of performing said application software transparently to said application software, and wherein in said secure mode said single-processor processing unit is capable of verifying that said single-processor processing unit is authorized to perform said application software,
switching from said monitored mode to said secure mode in response to a non-maskable interrupt (NMI) signal;
wherein said single processor performs the application software and verifies that said single-processor processing unit is authorized to perform said application software.

86. Memory or mass storage as in claim 85, including instructions capable of being interpreted by a computing device to perform steps of
in said monitored mode, performing by a portion of said single-processor processing unit instructions substantially identically to those performable by a semiconductor die for an ordinary processor otherwise not responsive to said secure mode.

87. Memory or mass storage as in claim 85, including instructions capable of being interpreted by a computing device to perform steps of
in said secure mode, performing by said single-processor processing unit extraordinary services requested by, and authorized for, said application software.

88. Memory or mass storage as in claim 85, including instructions capable of being interpreted by a computing device to perform steps of
interrupting said monitored mode and entering said secure mode in response to at least one of a plurality of techniques; and
when in said secure mode, determining by which technique said secure mode was entered.

89. Memory or mass storage as in claim 85, including instructions capable of being interpreted by a computing device to perform steps of
interrupting said monitored mode and entering said secure mode in response to at least one of: an interrupt, a reset signal, or a timer.

90. Memory or mass storage including instructions capable of being interpreted by a computing device to perform steps as in claim 85, including steps of in said secure mode, exiting said secure mode and performing said application software in said monitored mode.

91. Memory or mass storage as in claim 90, including instructions capable of being interpreted by a computing device to perform steps of
performing said application software without substantial change in original code for that application software, whereby the application software sees a processor environment that is not substantially different from an ordinary processor.

92. Memory or mass storage as in claim 90, including instructions capable of being interpreted by a computing device to perform steps of
when said application software needs services the secure processor oversees, the application software generates an interrupt, causing the secure mode to be re-entered, the services to be delivered to the application software, and the secure mode to be exited, whereby the application software can continue to execute in monitored mode.

93. Memory or mass storage as in claim 85, including instructions capable of being interpreted by a computing device to perform steps of
performing instructions in said secure mode in a power-on state.

94. Memory or mass storage as in claim 93, including instructions capable of being interpreted by a computing device to perform steps of
in response to said power-on state, performing secure code maintained in a persistent memory internal to a chip including said single-processor processing unit, said steps of performing secure code including steps of loading additional code from one or more trusted sources; verifying authenticity of said trusted sources; and verifying content integrity of said additional code.

95. Memory or mass storage as in claim 93, including instructions capable of being interpreted by a computing device to perform steps of
in response to said power-on state, performing secure code maintained in a persistent memory internal to a chip including said single-processor processing unit, said steps of performing secure code including steps of loading additional code from one or more trusted sources; verifying authenticity of said trusted sources; and verifying content integrity of said additional code;
wherein said steps of verifying authenticity and content integrity are performed in response to said persistent memory internal to said chip.

96. Memory or mass storage as in claim 93, including instructions capable of being interpreted by a computing device to perform steps of
in response to said power-on state, performing secure code maintained in a persistent memory internal to a chip including said single-processor processing unit, said steps of performing secure code including steps of loading additional code from one or more trusted sources; verifying authenticity of said trusted sources; and verifying content integrity of said additional code;
wherein
said steps of verifying authenticity and content integrity are performed in response to said persistent memory internal to said chip; and
said persistent memory internal to said chip includes at least one of: encryption keys, secure hash values, or other data for verification of said trusted sources and authentication of said additional code.

97. Memory or mass storage as in claim 85, wherein said application software includes at least one instruction for execution in said secure mode.

98. Memory or mass storage as in claim 97, wherein said at least one instruction for execution in said secure mode includes an additional function performable by said single-processor processing unit on behalf of a set of secure kernel code.

99. Memory or mass storage as in claim 97, wherein said at least one instruction for execution in said secure mode includes an additional function performable by said single-processor processing unit on behalf of a set of secure kernel code, said additional function including authenticating additional secure kernel code.

100. Memory or mass storage in a processing unit including instructions capable of being interpreted by a computing device to perform steps of
performing instructions by a single-processor processing unit, said single-processor processing unit including a security signal having at least a secure mode and a monitored mode;
switching from said monitored mode to said secure mode in response to a non-maskable interrupt (NMI) signal;
accessing, by said single-processor processing unit, at least one secure function in response to said security signal when said security signal indicates said secure mode, and refusing to access said secure function in response to said security signal when said security signal indicates said monitored mode;
wherein said secure function includes steps of recording external instructions in response to an external source, a trustworthiness of said external source being verifiable by said single-processor processing unit,
wherein said single processor performs instructions and has access to the at least one secure function.

101. Memory or mass storage as in claim 100, including instructions capable of being interpreted by a computing device to perform steps of
allowing said single-processor processing unit to access at least one secure circuit coupled to said single-processor processing unit only when said security signal indicates said secure mode.

102. Memory or mass storage as in claim 100, including instructions capable of being interpreted by a computing device to perform steps of
performing a set of application code maintained in memory or mass storage, said memory or mass storage coupled to said single-processor processing unit, said steps of performing being done without substantial change from said application code being performed on a substantially identical non-secure processing unit not responsive to said security signal.

103. Memory or mass storage as in claim 100, including instructions capable of being interpreted by a computing device to perform steps of
performing, by said single-processor processing unit, a set of application code maintained in memory or mass storage, coupled to said single-processor processing unit, when said single-processor processing unit is operating in said monitored mode.

104. Memory or mass storage as in claim 100, wherein said one secure function includes steps of
requesting said external instructions from said external source;
sending data responsive to said secure information to said external source, whereby said external source is capable of verifying that said single-processor processing unit is authorized to perform said external instructions; and
receiving said external instructions from said external source.

105. Memory or mass storage as in claim 100, including instructions capable of being interpreted by a computing device to perform steps of
monitoring access by said single-processor processing unit to an external device;
said steps of monitoring being responsive to said security signal and to a set of access rules, wherein when said single-processor processing unit attempts to access said external device in violation of said access rules, performing at least one secure function in response thereto.

106. Memory or mass storage as in claim 105, wherein said steps of monitoring are responsive to access by said by said single-processor processing unit, in response to at least one of
a number of accesses requested by said single-processor processing unit;
a number of instructions which said single-processor processing unit performs;
a parameter set by said single-processor processing unit which operating in said secure mode; or
an interval during which said single-processor processing unit is operating.

107. Memory or mass storage as in claim 100, including instructions capable of being interpreted by a computing device to perform steps of maintaining a set of secure information for read only access by said single-processor processing unit.

108. Memory or mass storage as in claim 107, wherein said steps of maintaining include steps of reading said set of secure information from a non-volatile memory.

109. Memory or mass storage as in claim 107, wherein said steps of maintaining include steps of reading said set of secure information from a non-volatile memory, and including steps of disabling writing of said non-volatile memory when said secure processor is packaged.

110. Memory or mass storage as in claim 107, wherein said steps of maintaining include steps of reading said set of secure information from a non-volatile memory, and including steps of disabling writing of said non-volatile memory when said secure processor is packaged, said steps of disabling including making substantially inaccessible a non-bonded pin.

111. Memory or mass storage as in claim 107, wherein said steps of maintaining include steps of reading said set of secure information from a non-volatile memory, and wherein said set of secure information is unique to said secure processor.

112. Memory or mass storage as in claim 100, wherein said one secure function includes steps of
- receiving said external instructions from said external source
- constructing data responsive to said external instructions; and
- comparing said data responsive to said external instructions with at least some of said secure information, whereby said single-processor processing unit is capable of verifying that said external instructions are accurate.

113. Memory or mass storage as in claim 112, wherein said steps of constructing include determining a computed signature value in response to said external instructions; and said steps of comparing include attempting to match said computed signature value against a recorded signature value included in said secure information.

114. Memory or mass storage as in claim 112, wherein said steps of receiving include at least one of
- receiving a set of messages, said set of messages collectively including said external instructions; or
- receiving a set of storage media, said set of storage media collectively including said external instructions.

115. Memory or mass storage in a processing unit including instructions capable of being interpreted by a computing device to perform steps of
- performing instructions on a processor, said processor having a secure mode and a monitored mode;
- wherein when said processor executes in said secure mode, said processor has access to at least one secure function for which said processor does not have access to when said processor executes in said monitored mode;
- wherein said processor executes in said secure mode during an interrupted state, said interrupted state being responsive to a non-maskable interrupt (NMI);
- wherein when said processor enters said secure mode, said processor transfers control to a set of secure code, said secure code not being alterable when said processor executes in said monitored mode;
- wherein a set of said secure code associated with said startup state includes instructions performable by said processor and directing said processor to add external instructions to secure code in response to an external source of said external instructions, a trustworthiness of said external source being verifiable by said processor in response to a set of secure information,
- wherein said single processor performs instructions and has access to the at least one secure function.

* * * * *